United States Patent
Bisht et al.

(10) Patent No.: US 12,445,503 B2
(45) Date of Patent: Oct. 14, 2025

(54) SYSTEM AND METHOD FOR FACILITATING SIMULTANEOUS COMMUNICATION WITH EMERGENCY SERVICES

(71) Applicant: JIO PLATFORMS LIMITED, Ahmedabad (IN)

(72) Inventors: Birendra Singh Bisht, Navi Mumbai (IN); Harbinder Pal Singh Saini, Navi Mumbai (IN); Anurag Sinha, Mumbai (IN); Priyanka Singh, Maharashtra (IN); Mangesh Shantaram Kale, Navi Mumbai (IN)

(73) Assignee: JIO PLATFORMS LIMITED, Ahmedabad (IN)

( * ) Notice: Subject to any disclaimer, the term of this patent is extended or adjusted under 35 U.S.C. 154(b) by 0 days.

(21) Appl. No.: 18/247,529

(22) PCT Filed: Mar. 17, 2023

(86) PCT No.: PCT/IB2023/052624
§ 371 (c)(1),
(2) Date: Mar. 31, 2023

(87) PCT Pub. No.: WO2023/187538
PCT Pub. Date: Oct. 5, 2023

(65) Prior Publication Data
US 2025/0016204 A1    Jan. 9, 2025

(30) Foreign Application Priority Data
Mar. 30, 2022    (IN) .............................. 202221018951

(51) Int. Cl.
*H04L 65/1016* (2022.01)
*H04L 65/403* (2022.01)
*H04W 4/90* (2018.01)

(52) U.S. Cl.
CPC ........ *H04L 65/1016* (2013.01); *H04L 65/403* (2013.01); *H04W 4/90* (2018.02)

(58) Field of Classification Search
CPC ..... H04L 65/1016; H04L 65/403; H04W 4/90
See application file for complete search history.

(56) References Cited

U.S. PATENT DOCUMENTS

| 9,736,630 B2 | 8/2017 | King |
| 2016/0037292 A1* | 2/2016 | King .................... G08B 25/016 455/404.2 |

(Continued)

FOREIGN PATENT DOCUMENTS

| EP | 2987152 B1 | 9/2021 |
| WO | 2017147014 A1 | 8/2017 |

OTHER PUBLICATIONS

ATIS-0700042, "Enhancing Location-Based Routing of Emergency Calls", Technical Report, Alliance for Telecommunications Industry Solutions, Jul. 12, 2019, Total pp. 33. https://access.atis.org/higherlogic/ws/public/download/48218.

(Continued)

*Primary Examiner* — Kristie D Shingles
(74) *Attorney, Agent, or Firm* — FINNEGAN, HENDERSON, FARABOW, GARRETT & DUNNER LLP

(57) ABSTRACT

The present disclosure relates to a system and method to facilitate a user device to establish simultaneous communication with plurality of emergency services. The system may include a network device including one or more processors that may cause the system to receive, from an Internet Protocol Multimedia Subsystem (IMS) server, a routed request derived based on an original request from the user device located at a pre-defined location. The network device may enable identification of a pre-defined contact information pertaining to the plurality of emergency services avail- (Continued)

able at the pre-defined location of the user device. Based on the identified pre-defined contact information, the network device may invoke a call leg to initiate communication with the respective plurality of emergency services. Based on the invoked call leg, the IMS server may establish the simultaneous communication of the user device with the plurality of emergency services.

20 Claims, 13 Drawing Sheets

(56) References Cited

U.S. PATENT DOCUMENTS

| | | | |
|---|---|---|---|
| 2017/0366955 A1* | 12/2017 | Edge | H04W 4/90 |
| 2018/0124124 A1* | 5/2018 | Corona | H04L 65/1073 |
| 2018/0262897 A1 | 9/2018 | Hennessy et al. | |
| 2019/0089832 A1* | 3/2019 | Rao | H04L 65/1069 |

OTHER PUBLICATIONS

International Search Report, PCT/IB2023/052624, mailed Jul. 18, 2023, Total pp. 03.

\* cited by examiner

SYSTEM AND METHOD FOR FACILITATING SIMULTANEOUS COMMUNICATION WITH EMERGENCY SERVICES

FIELD OF INVENTION

The present invention relates generally to network devices, and more particularly to next generation network devices to enable simultaneous communication with plurality of emergency services.

BACKGROUND OF THE INVENTION

The following description of related art is intended to provide background information pertaining to the field of the disclosure. This section may include certain aspects of the art that may be related to various features of the present disclosure. However, it should be appreciated that this section be used only to enhance the understanding of the reader with respect to the present disclosure, and not as admissions of prior art.

Emergency services such as, for example, healthcare, fire rescue services, ambulance, other rescue operations, police assistance, and other such entities, may be of utmost importance in times of an emergency. As such services may be instantly needed when an emergency situation such as accidents may occur, some factors such as, time required to contact the services and corresponding spontaneity of response may be of extreme importance to obtain timely assistance in such cases. Any delay in obtaining these services can prove to be unfavourable and even fatal in some cases.

A conventional approach to contact the emergency services may include calling respective contacts independently to inform about the emergency situation. Although this may seem to be convenient in a normal scenario, however, in an emergency situation, a user may not be in a rational state of mind to remember the emergency contacts or to find each contact. In addition, individually explaining to each emergency service may not only result in loss of precious time but also may be inconvenient or practically difficult for the user.

There is, therefore, a requirement in the art for an effective and economical system and method that can overcome aforementioned problems in the art and can effectively enable a faster, effective and next generation based service for facilitating simultaneous communication with plurality of emergency services.

OBJECTS OF THE PRESENT DISCLOSURE

Some of the objects of the present disclosure, which at least one embodiment herein satisfies are as listed herein below.

It is an object of the present disclosure to facilitate an effective, concurrent and improved communication with multiple emergency service contacts.

It is an object of the present disclosure to eliminate the need for dialling long digit codes for accessing emergency services, thus making the process less tedious and more user-friendly.

It is an object of the present disclosure to facilitate an economical and next generation based system and a method that can avoid the need for individually contacting each emergency service, thus avoiding unnecessary delay.

It is an object of the present disclosure to facilitate a system and a method that can enable an instant communication with multiple emergency service contacts irrespective of the location of the user.

SUMMARY

This section is provided to introduce certain objects and aspects of the present invention in a simplified form that are further described below in the detailed description. This summary is not intended to identify the key features or the scope of the claimed subject matter.

In an aspect, a system is proposed for facilitating a user device to establish simultaneous communication with plurality of emergency services. The system may include a network device, which may be associated with a service provider that provides a network service to the user device. The network may include one or more processors coupled with a memory. The memory may store instructions which when executed by the one or more processors causes the system to receive a routed request through an Internet Protocol Multimedia Subsystem (IMS) server that may be communicably operational with a server associated with the network device. In an example, the routed request may be derived based on an original request from a user device. The original request may indicate a requirement to establish the simultaneous communication of the user device with the plurality of emergency services. The system or network device may enable identification, based on any or a combination of the pre-defined location and a Transmission Gap Repetition Period (TGRP) value based on a pre-defined circle wise TGRP pertaining to the user device, a pre-defined contact information pertaining to the plurality of emergency services available at the location of the user device. Based on the identified pre-defined contact information, network device may invoke a call leg to initiate communication with the respective plurality of emergency services. Based on the invoked call leg, the IMS server may establish the simultaneous communication of the user device with the plurality of emergency services.

In an embodiment, the original request may be initiated by a user associated with the user device through dialing a first pre-defined number using a dialing pad of the user device, and wherein the first pre-defined number comprises an optimized short digit code that is dialed directly without a need for a network based executable set of instructions, and wherein the first pre-defined number comprises digits in a predefined range.

In an embodiment, prior to routing of the original request to the network device, the IMS server evaluates the pre-defined location of the user device at the time of initiation of the original request, and wherein prior to routing of the original request to the network device, the first pre-defined number is converted into a second pre-defined number depending on the pre-defined location of the user device.

In an embodiment, the conversion to the second pre-defined number is facilitated based on a Transmission Gap Repetition Period (TGRP) value that varies based on a subscription location of the user device, and wherein the subscription location pertains to a location corresponding to subscription of the network service for the user device.

In an embodiment, upon receiving the original request from the user device, the IMS server invokes a service check towards a telephony application server (TAS) corresponding to the subscription location such that the corresponding TAS provides the TGRP value.

In an embodiment, the user device is at least one of a wireless or wireline device that is subscribed or registered to the network service provided by the service provider, wherein the network service pertains to a fifth generation (5G) network, and wherein the service provider provides the network service corresponding to at least one of one of a cellular network service, a private network service, a satellite network service or a convergence network service.

In an embodiment, if the user device is a wireless device, the IMS server converts the first pre-defined number into the second pre-defined number, based on an assessment to check if, at the time of initiating the original request, the user device is located within an allowed zone of an enterprise at the pre-defined location, and wherein the allowed zone pertains to a site that is eligible to avail the network service facilitated by the service provider.

In an embodiment, if the original request is initiated from within the allowed zone, the original request is routed by the IMS server to the network device, and wherein, based on at least one of the TGRP or the nature of the second pre-defined number, the original request is routed to a corresponding network device at the pre-defined location.

In an embodiment, if the original request from within the allowed zone, the original request is rejected by the IMS server.

In an embodiment, the simultaneous communication facilitates to connect the user device with the plurality of emergency services through a conference communication call comprising at least one of an audio call or a video call.

In an embodiment, the network device initiates the simultaneous communication by invoking the call leg towards the identified set of pre-defined numbers pertaining to the plurality of emergency services followed by initiation of multimedia resource function (MRF) based call leg that facilitates to simultaneously add the identified set of pre-defined numbers in the conference communication call.

In an embodiment, the invoked call leg and the MRF based call leg is facilitated through exchange of communication data comprising at least one of a textual data, a video data and an audio data.

In an aspect, the present disclosure provides for a user equipment (UE) device for facilitating simultaneous communication with a plurality of emergency services, the UE being communicatively coupled to a network device. The coupling may include the steps of receiving a connection request from any or a combination of a mobile and a landline device, the connection request comprising dialing of an emergency number; sending an acknowledgment of the connection request to the network device; and transmitting a plurality of signals in response to the connection request.

In an aspect, a method is proposed for facilitating a user device to establish simultaneous communication with plurality of emergency services. The method may include a step of routing, by an Internet Protocol Multimedia Subsystem (IMS) communicably operational with a network device, an original request from the user device. In an embodiment, the original request may indicate a requirement to establish the simultaneous communication of the user device with the plurality of emergency services. The method may include a step of receiving, at the network device, the routed request for facilitating the simultaneous communication with the plurality of emergency services. The method may include a step of identifying, by the network device, based on any or a combination of the pre-defined location and a Transmission Gap Repetition Period (TGRP) value based on a pre-defined circle wise TGRP pertaining to the user device, a pre-defined contact information pertaining to the plurality of emergency services available at the location of the user device. The method may include a step of invoking, by the network device, based on the identified pre-defined contact information, a call leg to initiate communication with the respective plurality of emergency services. The method may include a step of establishing, by the IMS, based on the invoked call leg, the simultaneous communication of the user device with the plurality of emergency services.

In an aspect, the present disclosure provides for a non-transitory computer readable medium comprising machine executable instructions that are executable by a processor to: to receive a routed request through an Internet Protocol Multimedia Subsystem (IMS) server that may be communicably operational with a server associated with the network device. In an example, the routed request may be derived based on an original request from a user device located. The original request may indicate a requirement to establish the simultaneous communication of the user device with the plurality of emergency services. The processor may enable identification, based on any or a combination of the pre-defined location and a Transmission Gap Repetition Period (TGRP) value based on a pre-defined circle wise TGRP pertaining to the user device, a pre-defined contact information pertaining to the plurality of emergency services available at the location of the user device. Based on the identified pre-defined contact information, processor may invoke a call leg to initiate communication with the respective plurality of emergency services. Based on the invoked call leg, the IMS server may establish the simultaneous communication of the user device with the plurality of emergency services.

BRIEF DESCRIPTION OF DRAWINGS

The accompanying drawings, which are incorporated herein, and constitute a part of this invention, illustrate exemplary embodiments of the disclosed methods and systems in which like reference numerals refer to the same parts throughout the different drawings. Components in the drawings are not necessarily to scale, emphasis instead being placed upon clearly illustrating the principles of the present invention. Some drawings may indicate the components using block diagrams and may not represent the internal circuitry of each component. It will be appreciated by those skilled in the art that invention of such drawings includes the invention of electrical components, electronic components or circuitry commonly used to implement such components.

Figure 1A:
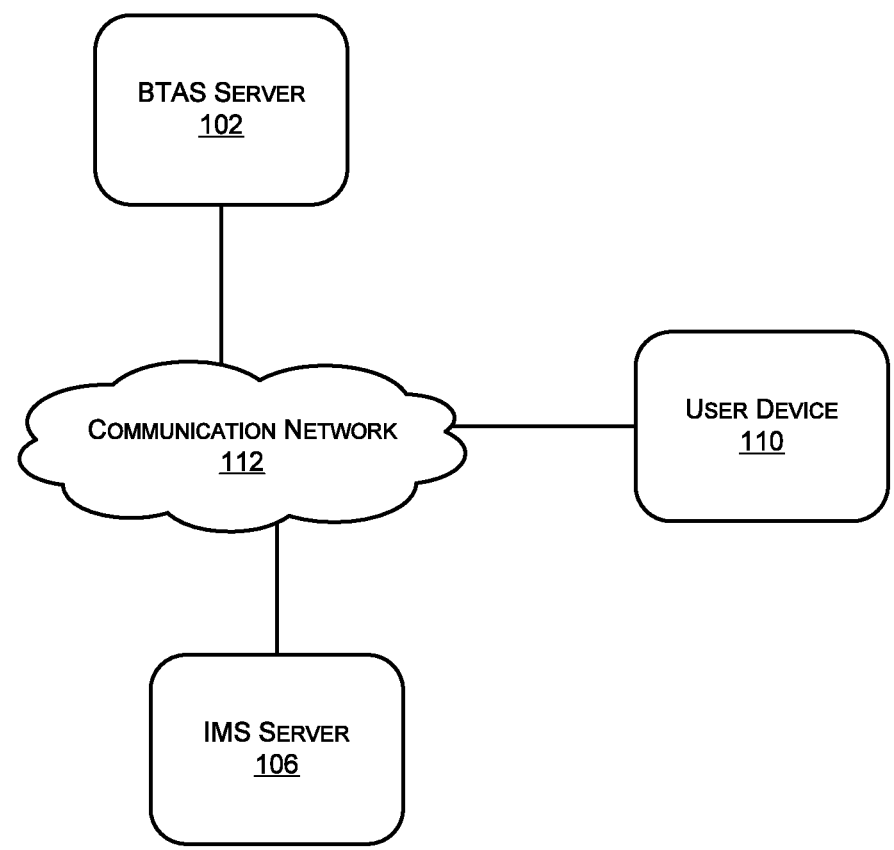
FIGS. 1A-1B illustrate exemplary network architecture in which or with which system of the present disclosure can be implemented, in accordance with an embodiment of the present disclosure.

The foregoing shall be more apparent from the following more detailed description of the invention.

DETAILED DESCRIPTION OF INVENTION

In the following description, for the purposes of explanation, various specific details are set forth in order to provide a thorough understanding of embodiments of the present disclosure. It will be apparent, however, that embodiments of the present disclosure may be practiced without these specific details. Several features described hereafter can each be used independently of one another or with any combination of other features. An individual feature may not address all of the problems discussed above or might address only some of the problems discussed above. Some of the problems discussed above might not be fully addressed by any of the features described herein.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

The present system and method facilitate to overcome the above mentioned problems by enabling establishment of an effective and concurrent communication of a user device with multiple emergency service contacts. For example, the communication may be added simultaneously in a conference call, without the need to sequentially establish the communication as done by the conventional systems. This aspect can enable to expedite the communication process for getting instant help from the emergency services. Further, the user may need to dial only a short dialling code using, for example, 1-6 digits code to be dialed using keypad on the user device. The short code may not only add to convenience of contacting in case of an emergency but also can reduce the need to remember or refer to individual pre-defined contact information of each emergency service, such as, for example, hospitals, fire and rescue services, police stations, emergency health services and other such services. Furthermore, the system and method also enable to perform location based service such that the emergency services are selected based on a current location of the user device (for example, Mumbai), even if the service may be subscribed for another location or circle (for example, Jamnagar). This may ensure that nearby emergency services at correct location may assist in case of an emergency. Several other advantages may be realized.

Figure 1B:
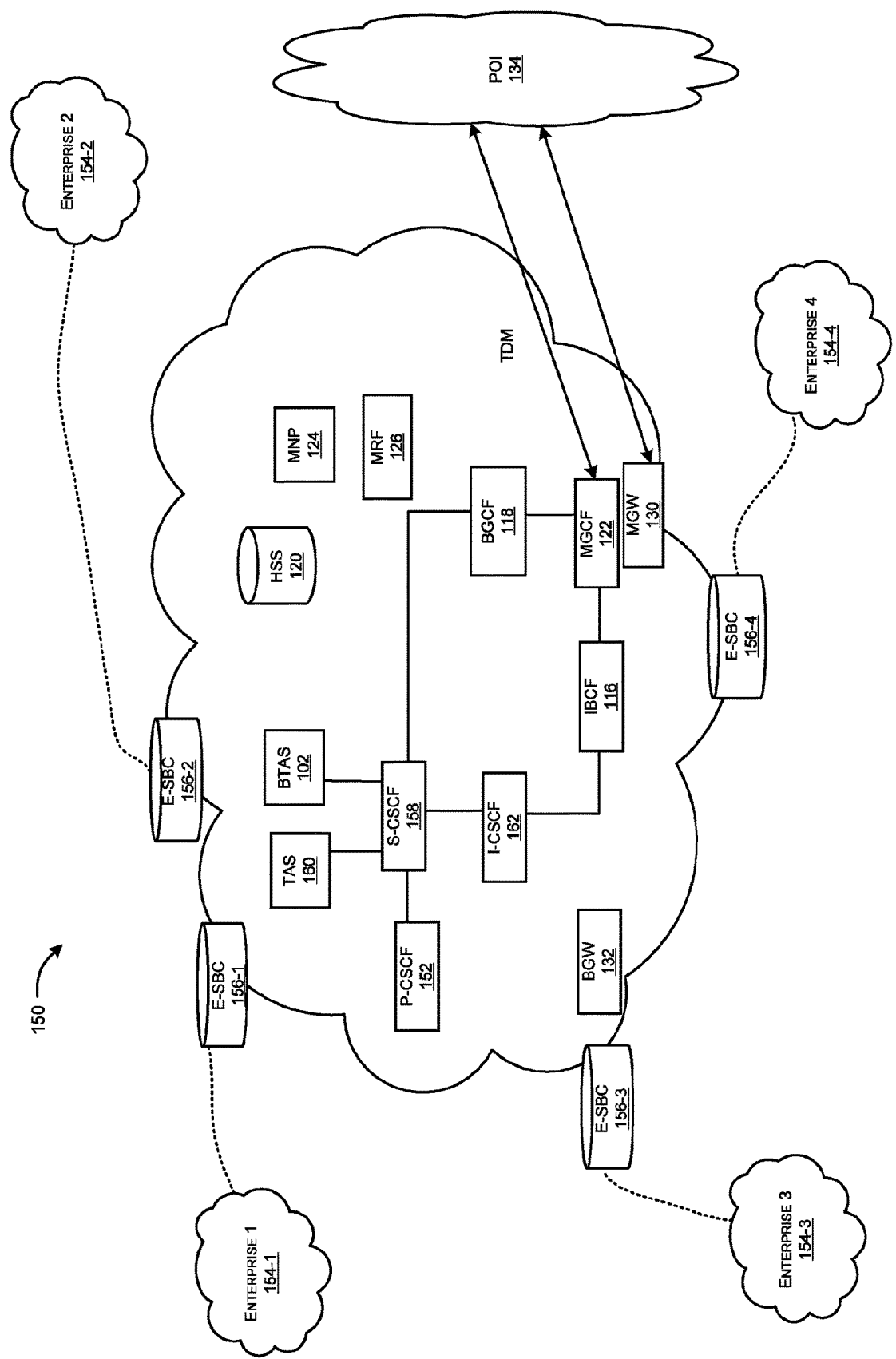

FIGS. 1A-1B illustrate exemplary network architecture 100 and 150 in which or with which system of the present disclosure can be implemented, in accordance with an embodiment of the present disclosure. As illustrated in representation 100 in FIG. 1A, a network device 102 (network device hereinafter interchangeably referred to as business telephony application server or BTAS 102) may be configured to facilitate a user device 110 to establish simultaneous communication with plurality of emergency services. The network device 102 may be configured as an application server and may be communicably operational or may be integrated with the Internet Protocol Multimedia Subsystem (IMS) server 106 (also interchangeably referred to as IMS or IMS core). The IMS server 106 may pertain to a vendor or service provider to enable a user device 110 (also referred to as the user equipment (UE) herein) to establish simultaneous communication with plurality of emergency services. In an embodiment, the BTAS or the network device 102 may be implemented in an existing IMS implementation to facilitate network service corresponding to communication network 112. In an example, the communication network 112 may pertain to, for example, fifth generation (5G) network service.

The user device 110 (also interchangeably referred to as a user equipment or UE or terminal 110) may be at least one of a wireline device or wireless device. For example, the wireline device may be a landline phone, a terminal device or any other stationary device through which communication may be established. The wireless device may be a mobile device that may include, for example, cellular telephone, such as a feature phone or smartphone and other devices. The user device may not be limited to the above mentioned devices, but may include any type of device capable of wireline or wireless communication, such as a cellular phone, a tablet computer, a personal digital assistant (PDA), a personal computer (PC), a laptop computer, a media centre, a work station and other such devices.

In an embodiment, the communication network 112 pertaining to BTAS based IMS implementation may be a Third Generation (3G) network, a Fourth Generation (4G) network, a Fifth Generation (5G) network, a Sixth Generation (6G) network, a Wireless Fidelity (Wi-Fi) network, any other wireless networks or combination thereof, and the like. The communication network 112 may be implemented as one of the different types of networks, such as Intranet, Local Area Network (LAN), Wide Area Network (WAN), Internet, and the like. Further, the network can either be a dedicated network or a shared network. The shared network can represent an association of the different types of networks that can use variety of protocols, for example, Hypertext Transfer Protocol (HTTP), Transmission Control Protocol/Internet Protocol (TCP/IP), Wireless Application Protocol (WAP), Automatic repeat request (ARQ), and the like. In an embodiment, the communication network 112 may pertain to a 5G network that may be facilitated through, for example, Global System for Mobile communication (GSM) network; a universal terrestrial radio network (UTRAN), an Enhanced Data rates for GSM Evolution (EDGE) radio access network (GERAN), an evolved universal terrestrial radio access network (E-UTRAN), a WIFI or other LAN access network, or a satellite or terrestrial wide-area access network such as a wireless microwave access (WIMAX) network. In an example embodiment, the communication network may enable 5G network based on subscription pertaining to the user/user device and/or through a Subscriber Identity Module (SIM) card. Various other types of communication network or service may be possible.

In an example, the communication network 112 may utilize different sort of air interface, such as a code division multiple access (CDMA), time division multiple access (TDMA), or frequency division multiple access (FDMA) air interface and other implementation. In an example embodiment, the wireline user device may use wired access networks, exclusively or in combination with wireless access networks, for example, including Plain Old Telephone Service (POTS), Public Switched Telephone Network (PSTN), Asynchronous Transfer Mode (ATM), and other network technologies configured to transport Internet Protocol (IP) packets.

The network service (corresponding to 112 in FIG. 1A) may be provided to multiple entities or enterprises, such as, for example, enterprise-1 (154-1), enterprise-2 (154-2), enterprise-3 (154-3), and enterprise-4 (154-4) (collectively termed as enterprise 154). In an embodiment, at least one of the enterprise 154 may include a IP private branch exchange (IP-PBX) (not shown) to enable switching calls between user devices 110 on local lines, wherein each enterprise 154 may communicate with the communication network/servers through an enterprise session border controllers (E-SBC). As shown in FIG. 1B, each enterprise, for example, enterprise-1 (154-1), enterprise-2 (154-2), enterprise-3 (154-3), and enterprise-4 (154-4) may be facilitated with the network service (such as 5G network service) through E-SBC 156-1, 156-2, 156-3 and 156-4 respectively. The E-SBC 156 may be an executable set of instructions for enabling connectivity and security pertaining to network of the enterprises and service providers. The IP-PBX may be a private branch exchange or a telephone switching system within an enterprise, which may enable, for example, switching call between users within an enterprise. In an embodiment, the BTAS 102 may be communicably coupled with other components, such as, for example, IP Telephone and provisioning servers. In an example embodiment, the IP-PBX may communicate with the E-SBC 154 via session initiation protocol (SIP) technique. The enterprise may pertain to an entity including, but not limited to, an organization, a company, a business, an educational campus, an office campus, a shopping centre, a residential area/community and various other entities that may wish to avail the communication network by the service provider. In an embodiment, the communication network may be available only within a pre-defined zone (allowed zone) of the enterprise. Various other types of entities/provisions are possible.

The IMS server (106 of FIG. 1A) may include one or more modules or components that may enable to perform one or more functions. For example, the IMS server may be an existing IMS core including components/modules handling various functions such as, serving-call session control function (S-CSCF) module 158, interrogating call session control function (I-CSCF) module 162, proxy-call session control function (P-CSCF) module 152. In an embodiment, the BTAS 102 may be integrated with a network of the IMS core and other application servers to provide a network service such as for example, a fifth generation (5G) network. For example, the other application server may include a telephony application server (TAS) 160, which may be considered as a general component used in a communication network to provide telephony applications and additional multimedia functions. In another example, the other application server may include Mobile number portability (MNP) server 124, which may provide number portability to users such as, for example, may allow retaining same number upon change in service provider. Various other servers may be integrated to the BTAS enabled IMS implementation for enabling one or more services pertaining to communication network or 5G network.

In reference to the components pertaining to the IMS, the S-CSCF module 158 may be a primary node in the IMS server responsible for session control such that a list of subscribers may be allocated respective S-CSCF module 158 at the time of IMS registration in order to facilitate routing of session initiation protocol (SIP) messages as part of service establishment procedures. In a general operation, the S-CSCF module 158 may enable downloading a subscriber profile from the home subscriber server (HSS) 120 the time of IMS registration. The I-CSCF module 162 may be a key element in the IMS server and may enable any request to be routed to an appropriate S-CSCF module 158 from multiple S-CSCFs within the network. The I-CSCF module 162 may also interrogate the HSS 120 to obtain an address of the relevant S-CSCF module 158 to process a SIP initiation request. As shown in FIG. 1B, the P-CSCF module 152 may act as an ingress and egress point to and from an IMS domain of the service provider with respect to the IMS client. The P-CSCF module 152 may perform general functions, such as, for example, onward routing of registration and session requests to the correct nodes in the communication network, updating the S-CSCF module 158, maintaining a secure connection with the user device, and other such functions. In an embodiment, the network device or BTAS 102 may be communicably coupled or be integrated with one or more functional components such as, for example, a session initiation protocol (SIP) based application server. The SIP server may be built with features pertaining to the type enterprise 154.

Further, as shown in FIG. 1B, to provide various aspects of the network service (such as 5G network), the components of IMS server (such as S-CSCF, I-CSCF module) may also include components/modules that pertain to functions, for example, breakout gateway control function (BGCF) module 118, a media gateway control function (MGCF) module 122, interconnect border control function (IBCF) 116 and other components/modules. In general implementation, the BGCF module 118 may enable routing call signalling to and from the most appropriate S-CSCF module 158. In the present implementation, the BGCF module 118 may enable to route the call to respective BTAS 102 for establishing the simultaneous communication with the plurality of emergency services. In general, the MGCF module 122 may be a SIP endpoint that can interface with security gateway (SGW) and may also control resources in media gateway (MGW) 130. The IBCF module 116 may enable boundary control between various service provider networks, thus providing BTAS enabled IMS network security in terms of signalling information. The IMS server may also include other existing components such as for example a component pertaining to multimedia resource function (MRF) module 126. The MRF module 126 in conjunction with other components of IMS, may be responsible for executing various processing tasks on media streams associated with particular services. Further, as shown in FIG. 1B, as the BTAS-IMS based implementation may be associated with point of interconnection (POI) 134, which may be physical interface between media gateways of varying service providers or enterprises.

Figure 2A:
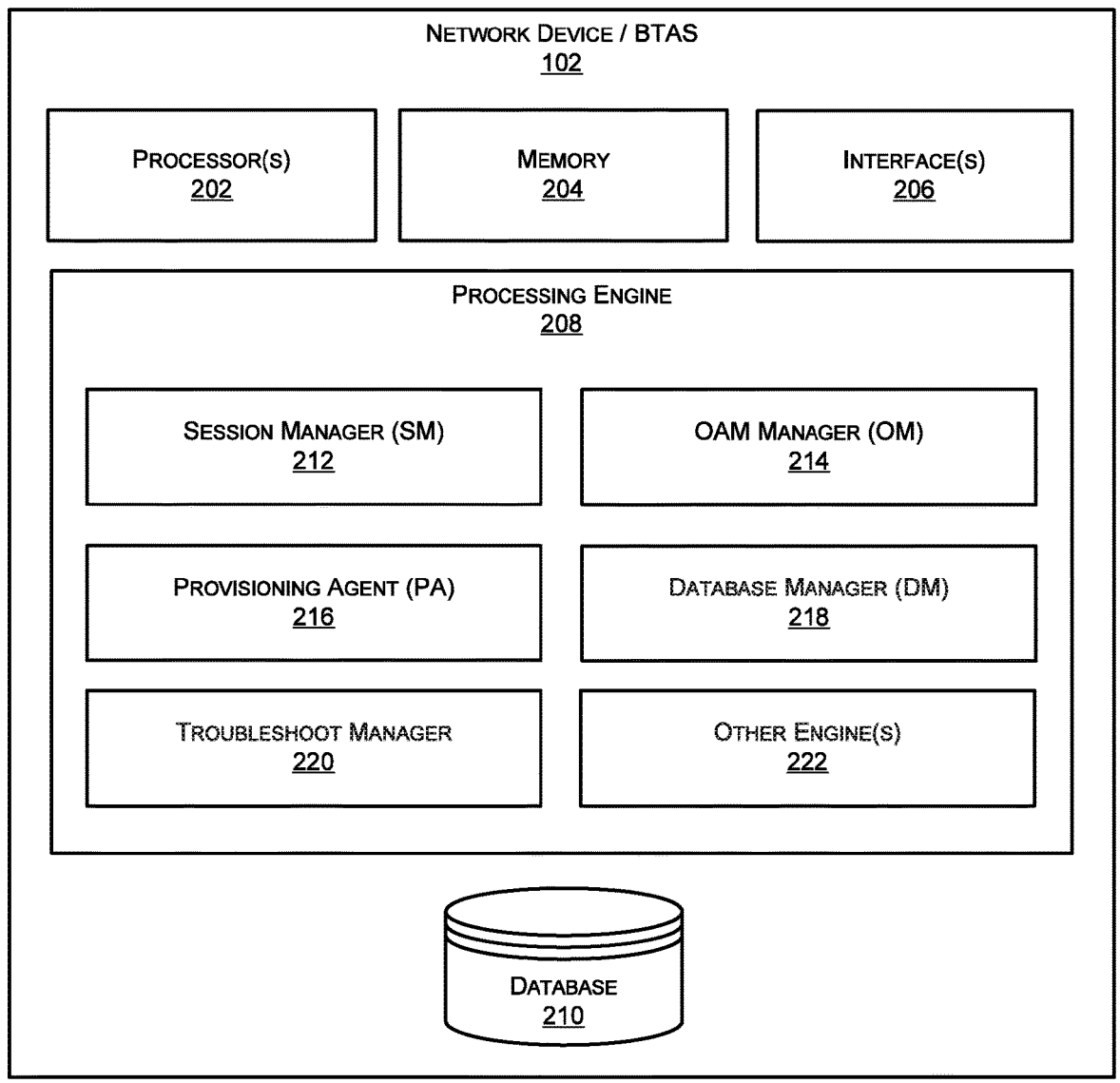
FIG. 2A with reference to FIG. 1A, illustrates an exemplary representation of a network device, in accordance with an embodiment of the present disclosure.

The system may facilitate the simultaneous communication by a combination of hardware and software implementation. FIG. 2A with reference to FIG. 1A, illustrates an exemplary representation of a network device, in accordance with an embodiment of the present disclosure. The system includes the network device or BTAS 102 that may include one or more processors. The network device or BTAS 102 may be integrated with IMS server 106 to provides a network service to a user device 110 (as shown in FIG. 1A). In an aspect, the network device 102 may include one or more processor(s) 202 coupled with a memory 204. The memory 204 may store instructions which when executed by the one or more processors may cause the system to perform the steps as described herein. The network device or BTAS 102 may cause the system to receive, through the IMS (106 of FIG. 1A), a routed request. In an example, the routed request may be derived based on an original request from a user device located at a pre-defined location. The original request may indicate a requirement to establish the simultaneous communication of the user device with the plurality of emergency services at the pre-defined location. The system or network device 102 enable identification, based on any or a combination of the pre-defined location and a Transmission Gap Repetition Period (TGRP) value based on a pre-defined circle wise TGRP pertaining to the user device, a pre-defined contact information pertaining to the plurality of emergency services available at the location of the user device. Based on the identified pre-defined contact information, network device 102 may invoke a call leg to initiate communication with the respective plurality of emergency services. Based on the invoked call leg, the IMS server (106 of FIG. 1A) may establish the simultaneous communication of the user device with the plurality of emergency services.

In an example embodiment, the original request may be routed to the BTAS 102 at which the user/user device may be present at the time of emergency. This may enable to contact the emergency services at the location where the emergency has occurred. This may be achieved by the IMS that may check the location of the user device and enable routing of the original request to BTAS at the location of emergency. In an embodiment, the pre-defined contact information may pertain to a contact information that may be pre-stored by the BTAS 102 based on the location at which the BTAS 102 may be operational.

The one or more processor(s) 202 may be implemented as one or more microprocessors, microcomputers, microcontrollers, digital signal processors, central processing units, logic circuitries, and/or any devices that process data based on operational instructions. Among other capabilities, the one or more processor(s) 202 may be configured to fetch and execute computer-readable instructions stored in a memory 204 of the system 102. The memory 204 may be configured to store one or more computer-readable instructions or routines in a non-transitory computer readable storage medium, which may be fetched and executed to create or share data packets over a network service. The memory 204 may comprise any non-transitory storage device including, for example, volatile memory such as RAM, or non-volatile memory such as EPROM, flash memory, and the like.

In an embodiment, the system 102 may include an interface(s) 206. The interface(s) 206 may comprise a variety of interfaces, for example, interfaces for data input and output devices, referred to as I/O devices, storage devices, and the like. The interface(s) 206 may facilitate communication of the system 102. The interface(s) 206 may also provide a communication pathway for one or more components of the system 110. Examples of such components include, but are not limited to, processing engine(s) 208 and a database 210.

The processing engine(s) 208 may be implemented as a combination of hardware and programming (for example, programmable instructions) to implement one or more functionalities of the processing engine(s) 208. In examples described herein, such combinations of hardware and programming may be implemented in several different ways. For example, the programming for the processing engine(s) 208 may be processor executable instructions stored on a non-transitory machine-readable storage medium and the hardware for the processing engine(s) 208 may comprise a processing resource (for example, one or more processors), to execute such instructions. In the present examples, the machine-readable storage medium may store instructions that, when executed by the processing resource, implement the processing engine(s) 208. In such examples, the system 102 may comprise the machine-readable storage medium storing the instructions and the processing resource to execute the instructions, or the machine-readable storage medium may be separate but accessible to the system 102 and the processing resource. In other examples, the processing engine(s) 208 may be implemented by electronic circuitry.

The processing engine 208 may include one or more components (as shown in FIG. 2A) including session manager (SM) 212, operations and maintenance (OAM) manager 214, provisioning agent 216, database manager (DM) 218 and troubleshooting manager (TM) 220. The SM 212 may act as core functional delivery module which may be responsible for call processing and service chaining logic execution in case of BTAS. The SM 212 may further include sub-modules such as call initiation module (not shown) for initiating a communication with the plurality of emergency services. The OAM manager 214 may be responsible for managing fault, configuration and performance aspects of the BTAS/network device. The OAM manager 214 may provide operations and maintenance touch point to the system or the BTAS 102. The DM 218 may manage database cluster where BTAS 102 may store subscriber specific service information. In an embodiment, a service data modification request that may be received by the provisioning agent 216 may be stored persistently using DM manager 218. The provisioning agent 218 may be responsible for handling provisioning request received from centralized provisioning server for persisting changes in database 210. The provisioning agent may also ensure that various session managers 212 may be updated about any dynamic changes in the service data. The TM 220 may aggregate logs and may debug information from all the functional managers for trouble shooting. The TM 220 may also provide flexibility to generate debug information, for example, in a Module wise, process wise, system wise manner. Various other functions of the components may be possible. In an embodiment, database 210 may comprise data that may be either stored or generated as a result of functionalities implemented by any of the components of the processing engine(s) 208 of the system 102.

Figure 2B:
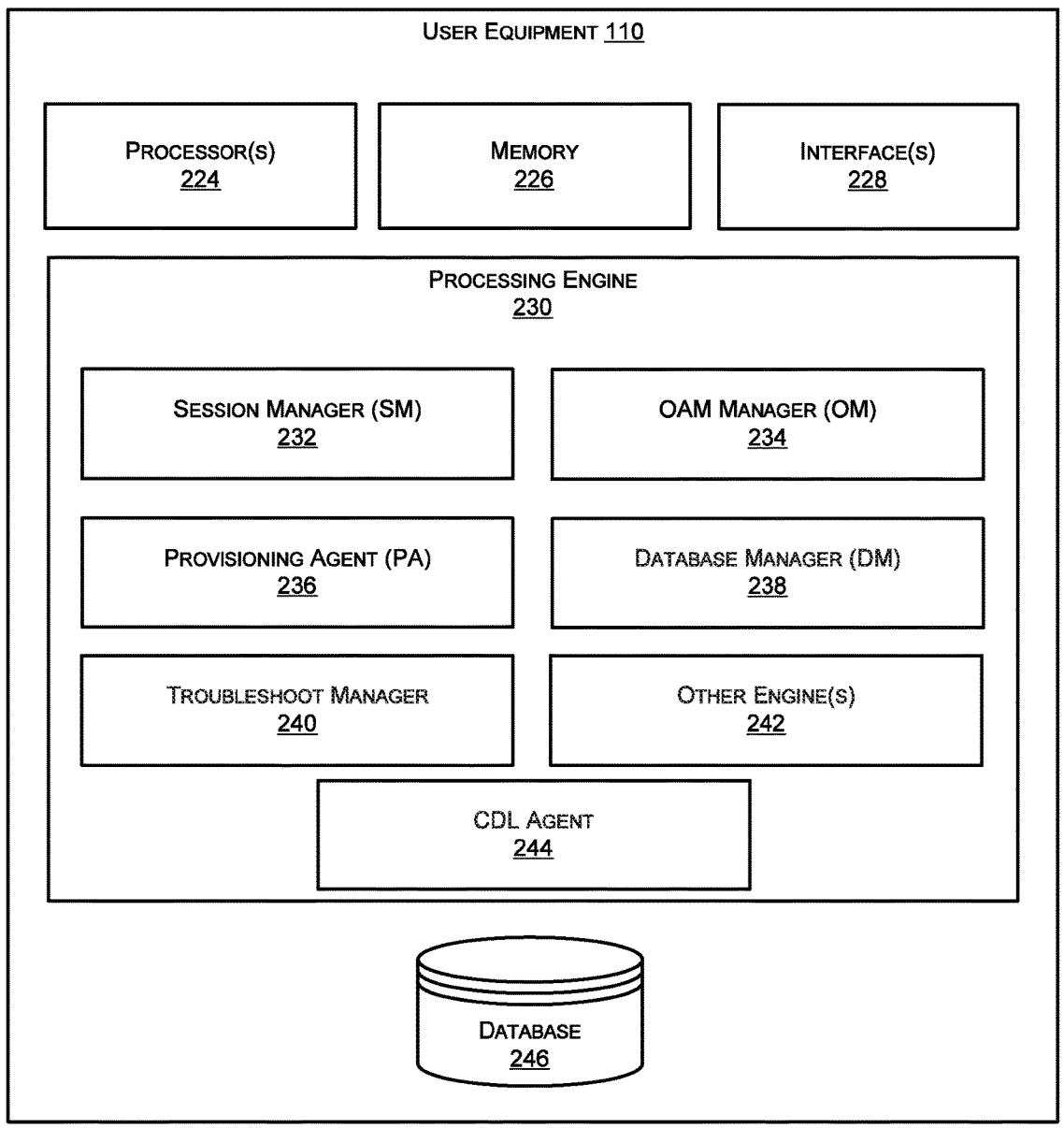
FIG. 2B with reference to FIG. 1A, illustrates an exemplary representation of a user equipment (UE), in accordance with an embodiment of the present disclosure.

FIG. 2B with reference to FIG. 1A, illustrates an exemplary representation of a user equipment (UE), in accordance with an embodiment of the present disclosure. The UE includes a processor (224) and may be implemented as one or more microprocessors, microcomputers, microcontrollers, digital signal processors, central processing units, logic circuitries, and/or any devices that process data based on operational instructions. Among other capabilities, the processor 224 may be configured to fetch and execute computer-readable instructions stored in a memory 226 of the UE (110). The memory 226 may be configured to store one or more computer-readable instructions or routines in a non-transitory computer readable storage medium, which may be fetched and executed to create or share data packets over a network service. The memory 226 may comprise any non-transitory storage device including, for example, volatile memory such as RAM, or non-volatile memory such as EPROM, flash memory, and the like.

In an embodiment, the UE (110) may include an interface(s) 228. The interface(s) 228 may comprise a variety of interfaces, for example, interfaces for data input and output devices, referred to as I/O devices, storage devices, and the like. The interface(s) 228 may facilitate communication of the UE (110). The interface(s) 228 may also provide a communication pathway for one or more components of the UE 110. Examples of such components include, but are not limited to, processing engine(s) 230 and a database 246.

The processing engine(s) 230 may be implemented as a combination of hardware and programming (for example, programmable instructions) to implement one or more functionalities of the processing engine(s) 230. In examples described herein, such combinations of hardware and programming may be implemented in several different ways. For example, the programming for the processing engine(s) 230 may be processor executable instructions stored on a non-transitory machine-readable storage medium and the hardware for the processing engine(s) 230 may comprise a processing resource (for example, one or more processors), to execute such instructions. In the present examples, the machine-readable storage medium may store instructions that, when executed by the processing resource, implement the processing engine(s) 230. In such examples, the UE 110 may comprise the machine-readable storage medium storing the instructions and the processing resource to execute the instructions, or the machine-readable storage medium may be separate but accessible to the UE 110 and the processing resource. In other examples, the processing engine(s) 230 may be implemented by electronic circuitry.

The processor (224) may enable coupling of the UE 110 with the BTAS (102). The coupling may include the steps of receiving a connection request from any or a combination of a mobile and a landline device, the connection request comprising dialing of an emergency number; sending an acknowledgment of the connection request to the network device; and transmitting a plurality of signals in response to the connection request.

Figure 2C:
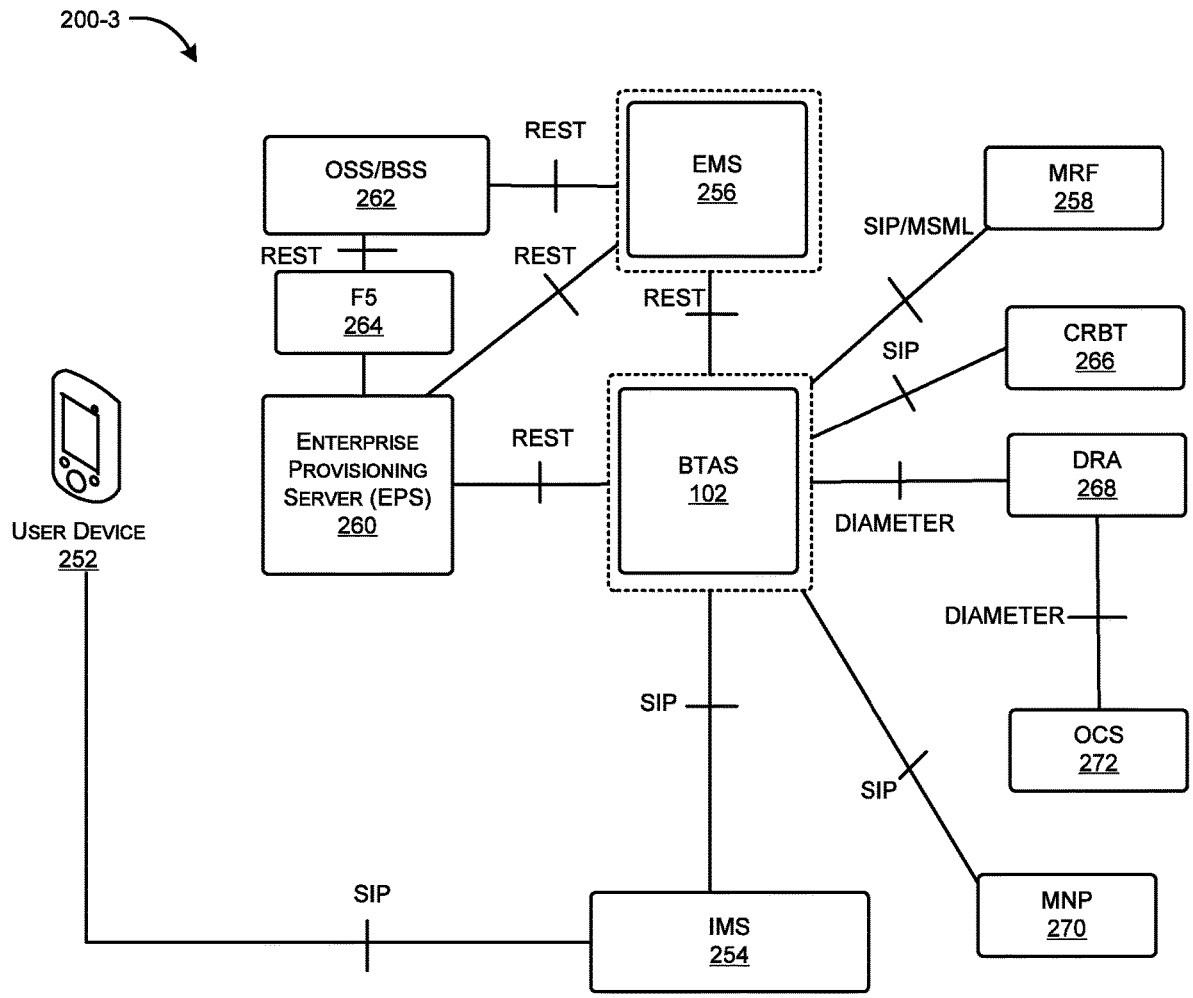
FIG. 2C illustrates exemplary representation of flow diagrams showing integration architecture of network device or BTAS, in accordance with embodiments of the present disclosure.

FIG. 2C illustrates exemplary representation of flow diagrams showing integration architecture of network device or BTAS, in accordance with embodiments of the present disclosure. As shown in FIG. 2B, the BTAS 102 may be integrated or coupled with various hardware/software components or servers for enabling one or more functions pertaining to communication of the user device with the plurality of emergency services. The BTAS 102 may be integrated with the IMS server 254 to enable the communication processing pertaining to a user device within an enterprise (154—as shown in FIG. 1B). In an example embodiment, the BTAS 102 may be integrated with IMS server 254 to establish and control communication connections via network protocol including, but not limited to, session initiation protocol (SIP). As the communication may also involve use of media in one or more forms, the BTAS 102 may integrate with multimedia resource function (MRF) 258. The BTAS 102 may interface with enterprise provisioning server (EPS) 260 via representational state transfer (REST) protocol to enable provisioning of service data.

In an example embodiment, the BTAS 102 may integrate with MRF 258 to enable functions, such as, for example, media mixing, control of announcement and other such purposes via network protocol including, but not limited to, session initiation protocol media server markup language (SIP-MSML). In an example embodiment, the BTAS 102 may be integrated or couple with other components/services such as Mobile Number Portability (MNP) 270 (via SIP) for enabling number portability dipping. In another example embodiment, the BTAS 102 and the EPS 260 may be independently integrated or coupled with element management system (EMS) via REST. The EMS may include hardware and software implementation for managing the five key aspects i.e. fault, configuration, accounting, performance and security (FCAPS) functionality via representational state transfer (REST) protocol to exchange messages pertaining to the key aspects that can use hypertext transfer protocol (HTTP) to transport the messages. The EMS may provide foundation to implement operations support system (OSS) or business support systems (BSS) based architecture that enable service providers to meet customer needs for example, for rapid deployment of services, to enable providing satisfying quality of service requirements and other such services. The EMS 256 may interface with OSS/BSS 262 via REST protocol to enable a northbound interface for FCAPS data of BTAS/EPS. The term northbound interface may relate to an interface that allows a particular component of a network to communicate with a higher-level component. The OSS/BSS 262 may interface with EPS 260 via REST protocol to enable functions such as, for example, service data management request.

Further, as shown in FIG. 2C, the BTAS 102 may be integrated or coupled with diameter routing agent (DRA) 268 via diameter protocol, which may be a standard protocol for authentication, authorization and accounting information in the IMS server based network. The DRA Diameter may be a functional element that may provide real-time routing capabilities to ensure that messages are routed among the correct elements in a network. The integration of BTAS 102 with the DRA 268 may enable to integration with online charging system (OCS) 272 for facilitating Ro charging. The OCS may be a system that allows a service provider to charge users or customers in real time based on service usage, and wherein the Ro charging pertains to a protocol that enables trigger to generate charging events. In an embodiment, the BTAS 102 may also be integrated with components pertaining to customized caller ringback tone (CRBT) 266 for enabling personalized ringback tone (RBT) at the stage of establishing the communication. For example, this may be mainly related to the ringback tone that may be played while connecting a call communication of the user device with the plurality of emergency services.

Figure 3:
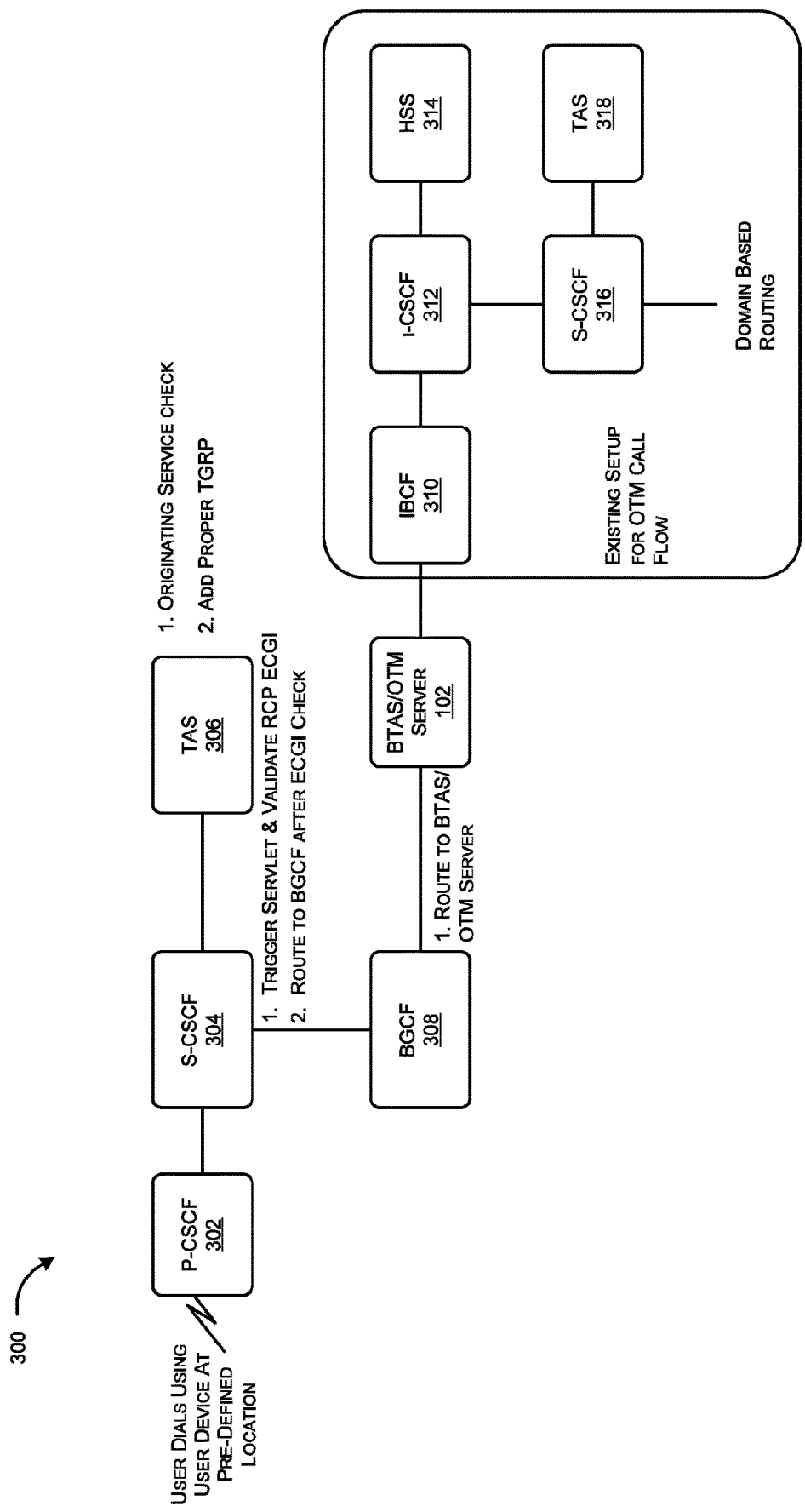
FIG. 3 illustrates an exemplary representation for facilitating simultaneous communication of a user device with plurality of emergency services, in accordance with an embodiment of the present disclosure.

FIG. 3 illustrates an exemplary representation for facilitating simultaneous communication of a user device with plurality of emergency services, in accordance with an embodiment of the present disclosure. In this example, the user may be subscribed to a wireless service such as, for example Voice over Long-Term Evolution (VoLTE) service (using wireless user device) from a service provider, wherein network device associated with the service provider may enable to establish simultaneous communication of user device with plurality of emergency services. As shown in FIG. 3, a solution is shown with respect to a user device at a pre-defined location. Upon requirement, for example, in an emergency situation, the user may initiate an original request from a user device located at a pre-defined location. The original request may indicate a requirement to establish the simultaneous communication of the user device with the plurality of emergency services. In an alternate embodiment, the user may initiate the original request through a Transmission Gap Repetition Period (TGRP) value based on a pre-defined circle wise TGRP pertaining to the user device. A predefined contact number may be generated associated with the plurality of emergency services. In an example embodiment, the original request may be initiated by the user through dialling a first pre-defined number using a dialling pad of the user device. In another example embodiment, the original request may be initiated by the user through a voice command using a microphone connected the user device. In yet another example embodiment, the original request may be initiated by the user through a video command using a display device connected the user device. For example, as shown in FIG. 2, a user may dial using user device at pre-defined location. The first pre-defined number may include an optimized short digit code that may be dialed directly without a need for a network based executable set of instructions, for example, without installing a new application. This can facilitate user convenience as at the time of emergency, the user may not be required to remember complicated long digit numbers and/or install/open a separate application.

As shown in FIG. 3, once the user may dial the short code (first pre-defined number), a corresponding P-CSCF module 302 of IMS server (associated with the service provider) may act as an ingress and egress point to and from IMS server. Further, S-CSCF module 304 of the IMS server may invoke a service check toward a telephony application server (TAS) 306 corresponding to subscription location such that the corresponding TAS provides the Transmission Gap Repetition Period (TGRP) value. The TGRP value varies based on the operational location, for example, subscription location of the user device. The subscription location may pertain to a location corresponding to subscription of the network service for the user device. The TAS may be based on the subscription of the user, for example, a Mumbai TAS may be checked if a Mumbai subscriber initiates the original request. In the next step, the TAS 306 may skip standard procedures such as, number mapping (ENUM) dip for the dialed number (first pre-defined number) and may instead send a message (for example, INVITE) back to S-CSCF module 304 by attaching appropriate TGRP. In an embodiment, new TGRP values may be used in TAS, whereas each TAS may use the same TGRP for certain cases, for example, in case of presence across nation (PAN) India service. The TGRP may vary based on the TAS, for example, Mumbai TAS may use TGRP=12 for PAN India, whereas Gujarat TAS may use TGRP=13 for PAN India service. The TGRP value may vary based on the pre-defined location of the user device and may be crucial in further routing the number to BTAS.

In an embodiment, prior to routing of the original request to the network device, the S-CSCF module 304 may convert the first pre-defined number into a second pre-defined number depending on the pre-defined location of the user device. In an example embodiment, the conversion to the second pre-defined number is facilitated based on TGRP value. In an example, the number dialed by the user may be converted into second pre-defined number by servlet such that the second pre-defined number may be same in PAN India S-CSCF module for a category of user devices, such as, for example, office cell IDs. This may be to ensure that server associated with network device (OTM server) may invoke call leg towards emergency numbers. In an embodiment, and to ensure that the emergency services are contacted at the same location as the user device (considering also the subscription of the user), the S-CSCF module may convert the first pre-defined number into the second pre-defined number, based on an assessment to check if, at the time of initiating the original request, the user device is located within an allowed zone of an enterprise at the pre-defined location. The allowed zone may pertain to a site that may be eligible to the enterprise to avail the network service facilitated by the service provider. Further, as the user device may be a wireless device in this example, the location of the user device may be required to be confirmed. This may be essential as in an example, the implementation may be executed for a specific allowed zone at the pre-defined location. For example, the solution may be implemented within an office campus (allowed zone) or within a university campus (allowed zone) located in a city/state (pre-defined location). Further, it may also be possible that the user may be subscribed for one pre-defined location and may be present at another pre-defined location at the time of emergency. For example, a user who may be subscribed to Mumbai/Maharashtra circle may be in a campus in Jamnagar/Gujarat at the time of emergency. In an embodiment, if the original request may be initiated from within the allowed zone, the original request may be routed by the S-CSCF module 304 to the network device or BTAS 102 through a breakout gateway control function (BGCF) 308 of the IMS server. In an embodiment, the BGCF 308 may select home BTAS/OTM server 102 based on TGRP received from S-CSCF module 304. In another embodiment, if the original request may not be from within the allowed zone, the original request may be rejected by the S-CSCF module 304. In an example embodiment, based on at least one of the TGRP or the nature of the second pre-defined number, the original request may be routed to a corresponding network device or BTAS at the pre-defined location (location at which emergency has occurred. The nature of the second pre-defined number may include certain common digits based on the location of emergency. For example, second pre-defined numbers starting with "22" may be forwarded to Gujarat based BTAS, whereas second pre-defined numbers starting with "12" may be forwarded to Mumbai based BTAS. Various other techniques may be used.

In an embodiment, the BTAS 102 may identify, based on the pre-defined location, a pre-defined contact information pertaining to the plurality of emergency services available at the pre-defined location of the user device. The BTAS 102 may invoke, based on the identified pre-defined contact information, a call leg to initiate communication with the respective plurality of emergency services. In an example embodiment, the network device or BTAS 102 may initiate the simultaneous communication by invoking the call leg towards the identified pre-defined numbers pertaining to the plurality of emergency services followed by initiation of multimedia resource function (MRF) based call leg that facilitates to simultaneously add the identified pre-defined numbers, for example, in the conference communication call. For example, the simultaneous communication facilitates to connect the user device with the plurality of emergency services through a conference communication call including at least one of an audio call or a video call. In an embodiment, the invoked call leg and the MRF based call leg may be facilitated through exchange of communication data comprising at least one of a textual data, a video data and an audio data.

In an embodiment, the network device 102 may route the simultaneous communication to the IMS server through an interconnect border control function (IBCF) module 310 of the IMS server. Based on the invoked call leg, the IMS server may establish the simultaneous communication of the user device with the plurality of emergency services. This may be initiated by the Interrogating-Call Session Control Function (I-CSCF) module 312. The I-CSCF module 312 may be responsible for onward routing of SIP messages to the appropriate S-CSCF module 316 based on the subscription of network service to the user device, which the I-CSCF module 312 may determine. The I-CSCF module 312 may query HSS 314 in order to discover/decide the appropriate S-CSCF module 316 to which a particular subscription may be assigned. The appropriate S-CSCF module 316, in communication with corresponding TAS 318, may enable establishment of the simultaneous communication. In an embodiment, call detailed records (CDRs) may be generated for short code (first-predefined number) and forked numbers (set of pre-defined numbers) in TAS 318 and BTAS 102. In another embodiment, an originating Ro trigger may be invoked by TAS 318 for the short code (first-predefined number) and the forked numbers (set of pre-defined numbers) for purpose of estimating charging or costs associated with the service. In an example, the short code or the first-predefined number may be required to be in the OCS 272 (shown in FIG. 3) as the first-predefined number be a new number.

FIGS. 4A-4D illustrate representation 400, 420, 460 and 480 showing various exemplary scenarios in facilitating simultaneous communication of a user device with plurality of emergency services, in accordance with an embodiment of the present disclosure. The example scenarios as discussed in FIGS. 4A-4D are described to depict the operations of the system, based on the subscription of the user device and allowed zone from which the user may dial short code (first pre-defined number). In a specific example as shown in representation 400 in FIG. 4A, the user may be a Mumbai subscriber subscribed to a wireless service (wireless user device) from a service provider. In case of emergency, the user may dial the first-predefined number (initiation of original request) using the user device from an allowed zone in Mumbai, for example, an office campus in Mumbai. Once the user may dial the short code (first pre-defined number), a corresponding Mumbai based P-CSCF module 402 of IMS server (associated with the service provider) may act as an ingress and egress point to and from IMS server. Further, corresponding Mumbai based S-CSCF module 404 of the IMS server may invoke a service check toward a Mumbai based TAS 406 corresponding to the subscription location such that the corresponding Mumbai based TAS 406 may provide the TGRP value (in this example, TGRP=12). In the next step, the Mumbai based TAS 406 may skip standard procedures such as, number mapping (ENUM) dip for the dialed number (first pre-defined number) and may instead send a message (for example, INVITE) back to the Mumbai based S-CSCF module 404 by attaching appropriate TGRP. In an embodiment, if the original request may be initiated from within the allowed zone (for example, Mumbai office campus), the original request may be routed by the S-CSCF module 304 to the network device or BTAS 102 (which receives a routed request) through a Mumbai based BGCF module 408 of the IMS server. Prior to routing of the original request to the network device, the first pre-defined number may be converted into a second pre-defined number depending on the pre-defined location of the user device. In an embodiment, the Mumbai based BGCF 408 may select home BTAS/OTM server 102 based on TGRP received from Mumbai based S-CSCF module 404 and/or the nature of the second pre-defined number. For example, if the dialed code (original request) may be a number such as 1111, the second pre-defined number may be 121111, wherein the initial digits "12" may indicate that Mumbai based BTAS needs to be selected (Mumbai being the pre-defined location at which the original request was initiated). In an alternate embodiment, if the original request may not be from within the allowed zone, the original request may be rejected by the Mumbai based S-CSCF module 404. In this emergency flow, always home BTAS/OTM will be selected and further call will be forked towards pre-defined emergency numbers based on received short code, i.e. if 121111 is received then call will be forked to Mumbai emergency numbers and if 221111 is received then it will be towards Gujrat emergency numbers likewise.

Upon receiving the routed request, the BTAS 102 may identify, based on the pre-defined location, a pre-defined contact information pertaining to the plurality of emergency services available at the pre-defined location (Mumbai) of the user device. The BTAS 102 may invoke, based on the identified pre-defined contact information, a call leg to initiate communication with the respective plurality of emergency services in Mumbai. In an example embodiment, the network device or BTAS 102 may initiate the simultaneous communication by invoking the call leg towards the identified set of pre-defined numbers pertaining to the plurality of emergency services followed by initiation of MRF based call leg that facilitates to simultaneously add the identified set of pre-defined numbers, for example, in the conference communication call. The network device or BTAS 102 may route the simultaneous communication to the IMS server through Mumbai based IBCF 410 of the IMS server. Based on the invoked call leg, the IMS server may establish the simultaneous communication of the user device with the plurality of emergency services. This may be initiated by the Mumbai based I-CSCF module 412. The Mumbai based I-CSCF module 412 may be responsible for onward routing of SIP messages to the appropriate Mumbai based S-CSCF module 416 based on the subscription of network service to the user device. The Mumbai based I-CSCF module 412 may query Mumbai based HSS 414 in order to discover/decide the appropriate Mumbai based S-CSCF module 416 to which a particular subscription may be assigned. The appropriate Mumbai based S-CSCF module 416, in communication with corresponding Mumbai based TAS 418, may enable establishment of the simultaneous communication.

Figure 4A:
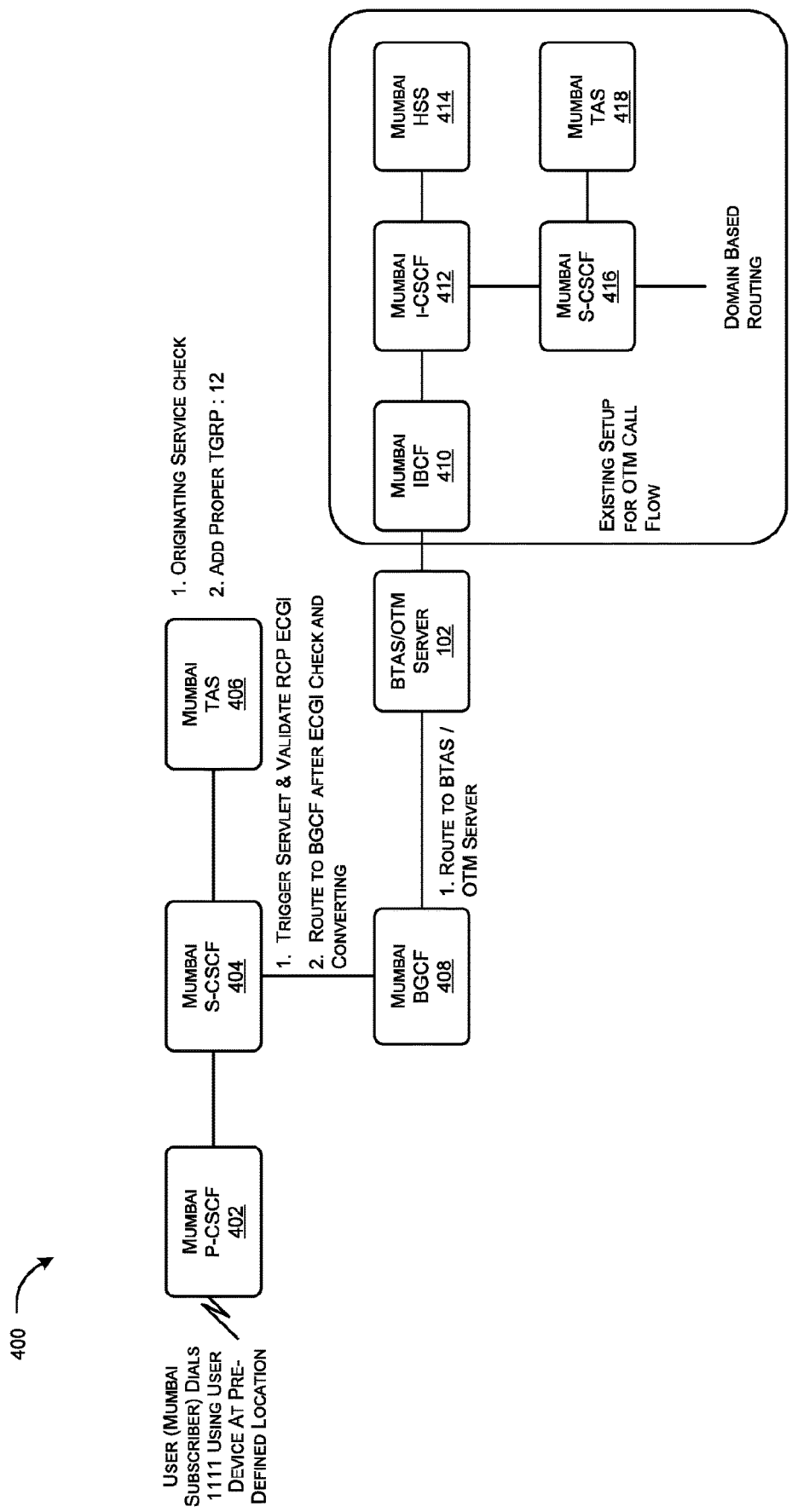
FIGS. 4A-4D illustrate representation 400, 420, 460 and 480 showing various exemplary scenarios in facilitating simultaneous communication of a user device with plurality of emergency services, in accordance with an embodiment of the present disclosure.
Figure 4B:
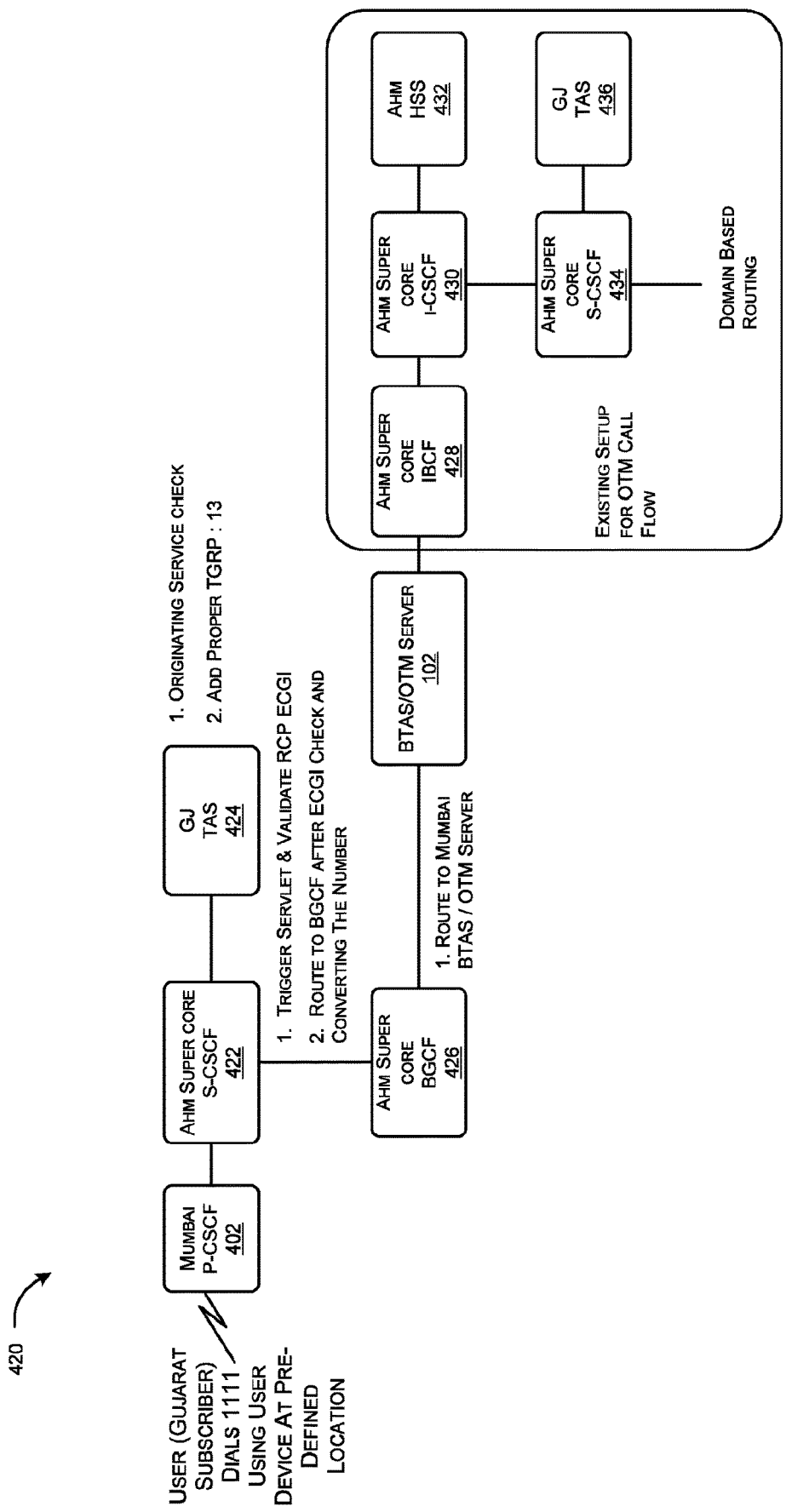

In a specific example as shown in representation 420 in FIG. 4B, the user may be, for example, a Gujrat VoLTE subscriber subscribed to a wireless service (wireless user device) from a service provider. At the time of emergency, the user may be present in an allowed zone at a pre-defined location (different from the subscription location), for example in a Mumbai office campus using a roaming network service. The user may dial the first-predefined number (initiation of original request) using his/her user device from within the allowed zone in Mumbai. In this example, as the user is in a different location, the subscription location may be verified by the IMS. Once the user may dial the short code (first pre-defined number), a corresponding Mumbai based P-CSCF module 402 of IMS server (associated with the service provider) may act as an ingress and egress point to and from IMS server. Further, the next step will be initiated by a Gujarat based S-CSCF (shown as Ahmedabad (Ahm) S-CSCF module) 422 as in this example, the user is subscribed to Gujarat circle. The Gujarat based S-CSCF module 422 of the IMS server may invoke a service check toward a Gujarat based TAS 424 corresponding to subscription location (Gujarat) such that the Gujarat based TAS 424 may provide the TGRP value (in this example, TGRP=13). In the next step, the Gujarat based TAS 424 may skip standard procedures such as, number mapping (ENUM) dip for the dialed number (first pre-defined number) and may instead send a message (for example, INVITE) back to the Gujarat based S-CSCF module 422 by attaching appropriate TGRP. In an embodiment, if the original request may be initiated from within the allowed zone (for example, Mumbai office campus), the original request may be allowed, otherwise it may be rejected. In case if the request is allowed, the original request routed by the Gujarat based S-CSCF module 422 to the network device or BTAS 102 (which receives routed request) through a Gujarat based BGCF 426 of the IMS server. Prior to routing of the original request to the network device, the first pre-defined number may be converted into a second pre-defined number depending on the pre-defined location of the user device. In an embodiment, the Gujarat based BGCF module 426 may select home BTAS/OTM server 102 based on TGRP received from Gujarat based S-CSCF module 422 and/or the nature of the second pre-defined number. For example, if the dialed code (original request) may be a number such as 1111, the second pre-defined number may be 121111, wherein the initial digits "12" may indicate that Mumbai based BTAS needs to be selected (Mumbai being the pre-defined location at which the original request was initiated).

Upon receiving the routed request, the BTAS 102 may identify, based on the pre-defined location, a pre-defined contact information pertaining to the plurality of emergency services available at the pre-defined location (Mumbai) of the user device. The BTAS 102 may invoke, based on the identified pre-defined contact information, a call leg to initiate communication with the respective plurality of emergency services in Mumbai. In an example embodiment, the network device or BTAS 102 may initiate the simultaneous communication by invoking the call leg towards the identified set of pre-defined numbers pertaining to the plurality of emergency services followed by initiation of multimedia resource function (MRF) based call leg that facilitates to simultaneously add the identified set of pre-defined numbers, for example, in the conference communication call. The network device or BTAS 102 may route the simultaneous communication to the IMS server through Gujarat based IBCF 428 of the IMS server. Based on the invoked call leg, the IMS server may establish the simultaneous communication of the user device with the plurality of emergency services. This may be initiated by the Gujarat based I-CSCF module 430. The Gujarat based I-CSCF module 430 may be responsible for onward routing of SIP messages to the appropriate Gujarat based S-CSCF module 424 based on the subscription of network service to the user device. The Gujarat based I-CSCF 430 may query Gujarat based HSS 432 in order to discover/decide the appropriate Gujarat based S-CSCF module 434 to which the subscription may be assigned. The appropriate Gujarat based S-CSCF module 434, in communication with corresponding Gujarat based TAS 436, may enable establishment of the simultaneous communication.

Figure 4C:
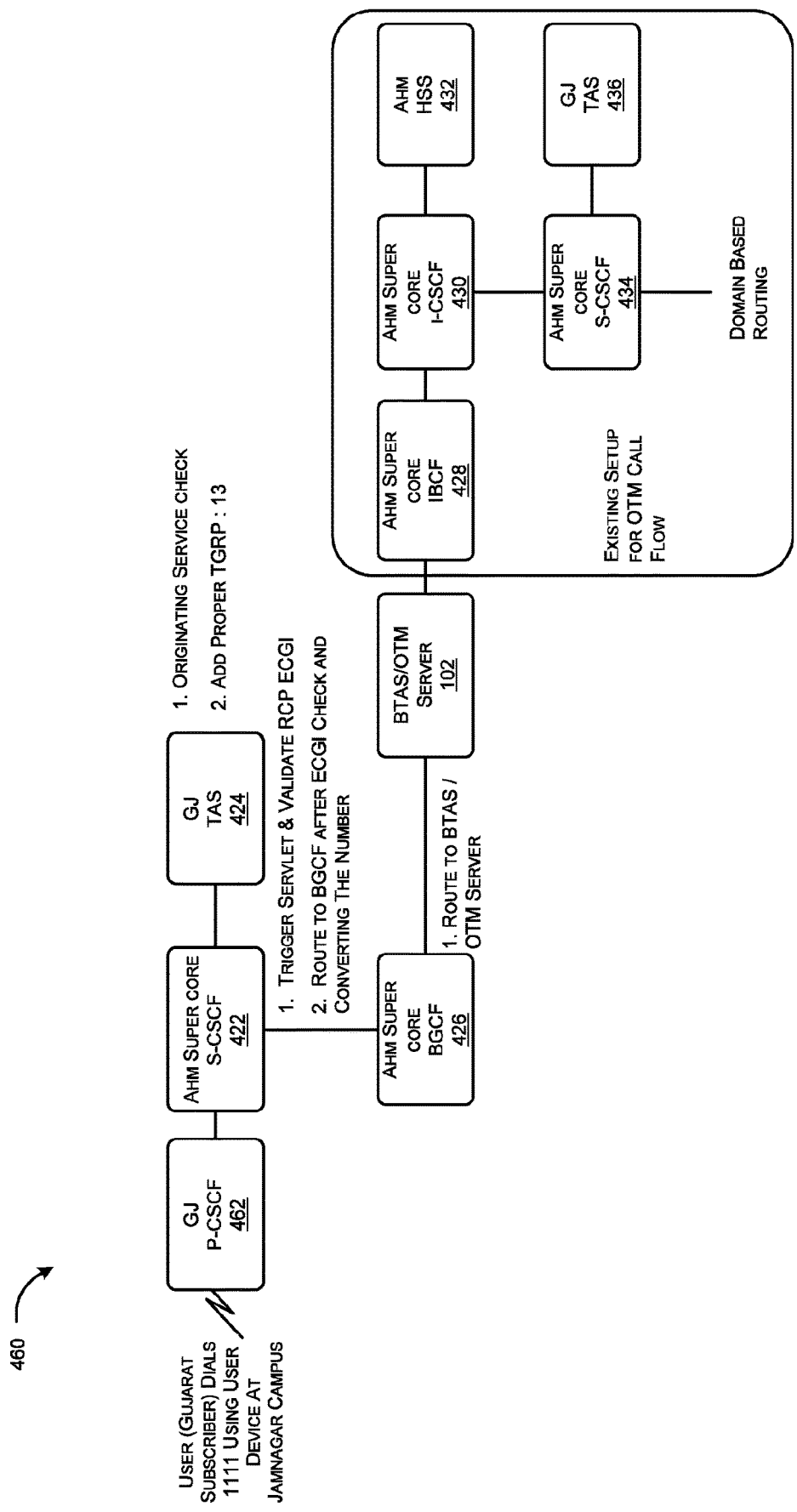

In a specific example as shown in representation 460 in FIG. 4C, the user may be, for example, a Gujrat VOLTE subscriber subscribed to a wireless service (wireless user device) from a service provider. At the time of emergency, the user may be present in an allowed zone at a pre-defined location (same as the subscription location), for example in a Jamnagar office campus (within Gujarat). The user may dial the first-predefined number (initiation of original request) using his/her user device from within the allowed zone in Gujarat. Once the user may dial the short code (first pre-defined number), a corresponding Gujarat based P-CSCF module 462 of IMS server (associated with the service provider) may act as an ingress and egress point to and from IMS server. Further, the next step will be initiated by a Gujarat based S-CSCF module (shown as Ahmedabad (Ahm) S-CSCF) 422 as in this example, the user is subscribed to Gujarat circle. The Gujarat based S-CSCF module 422 of the IMS server may invoke a service check toward a Gujarat based TAS 424 corresponding to subscription location (Gujarat) such that the Gujarat based TAS 424 may provide the TGRP value (in this example, TGRP=13). In the next step, the Gujarat based TAS 424 may skip standard procedures such as, number mapping (ENUM) dip for the dialed number (first pre-defined number) and may instead send a message (for example, INVITE) back to the Gujarat based S-CSCF module 422 by attaching appropriate TGRP. In an embodiment, if the original request may be initiated from within the allowed zone (for example, Jamnagar office campus in Gujarat), the original request may be allowed, otherwise it may be rejected. In case if the request is allowed, the original request routed by the Gujarat based S-CSCF module 422 to the network device or BTAS 102 (which receives routed request) through a Gujarat based BGCF 426 of the IMS server. In an embodiment, the Gujarat based BGCF module 426 may select home BTAS/OTM server 102 based on TGRP received from Gujarat based S-CSCF module 422. Prior to routing of the original request to the network device, the first pre-defined number may be converted into a second pre-defined number depending on the pre-defined location of the user device. In an embodiment, the Gujarat based BGCF module 426 may select home BTAS/OTM server 102 based on TGRP received from Gujarat based S-CSCF module 422 and/or the nature of the second pre-defined number. For example, if the dialed code (original request) may be a number such as 1111, the second pre-defined number may be 221111, wherein the initial digits "22" may indicate that Gujarat based BTAS needs to be selected (Gujarat being the pre-defined location at which the original request was initiated).

Upon receiving the routed request, the BTAS 102 may identify, based on the pre-defined location, a pre-defined contact information pertaining to the plurality of emergency services available at the pre-defined location (Gujarat) of the user device. The BTAS 102 may invoke, based on the identified pre-defined contact information, a call leg to initiate communication with the respective plurality of emergency services in Gujarat (Jamnagar). The network device or BTAS 102 may route the simultaneous communication to the IMS server through Gujarat based IBCFmodule 428 of the IMS server. Based on the invoked call leg, the IMS server may establish the simultaneous communication of the user device with the plurality of emergency services. This may be initiated by the Gujarat based I-CSCF module 430. The Gujarat based I-CSCF module 430 may be responsible for onward routing of SIP messages to the appropriate Gujarat based S-CSCF module 424 based on the subscription of network service to the user device. The Gujarat based I-CSCF module 430 may query Gujarat based HSS 432 in order to discover/decide the appropriate Gujarat based S-CSCF module 434 to which the subscription may be assigned. The appropriate Gujarat based S-CSCF module 434, in communication with corresponding Gujarat based TAS 436, may enable establishment of the simultaneous communication.

Figure 4D:
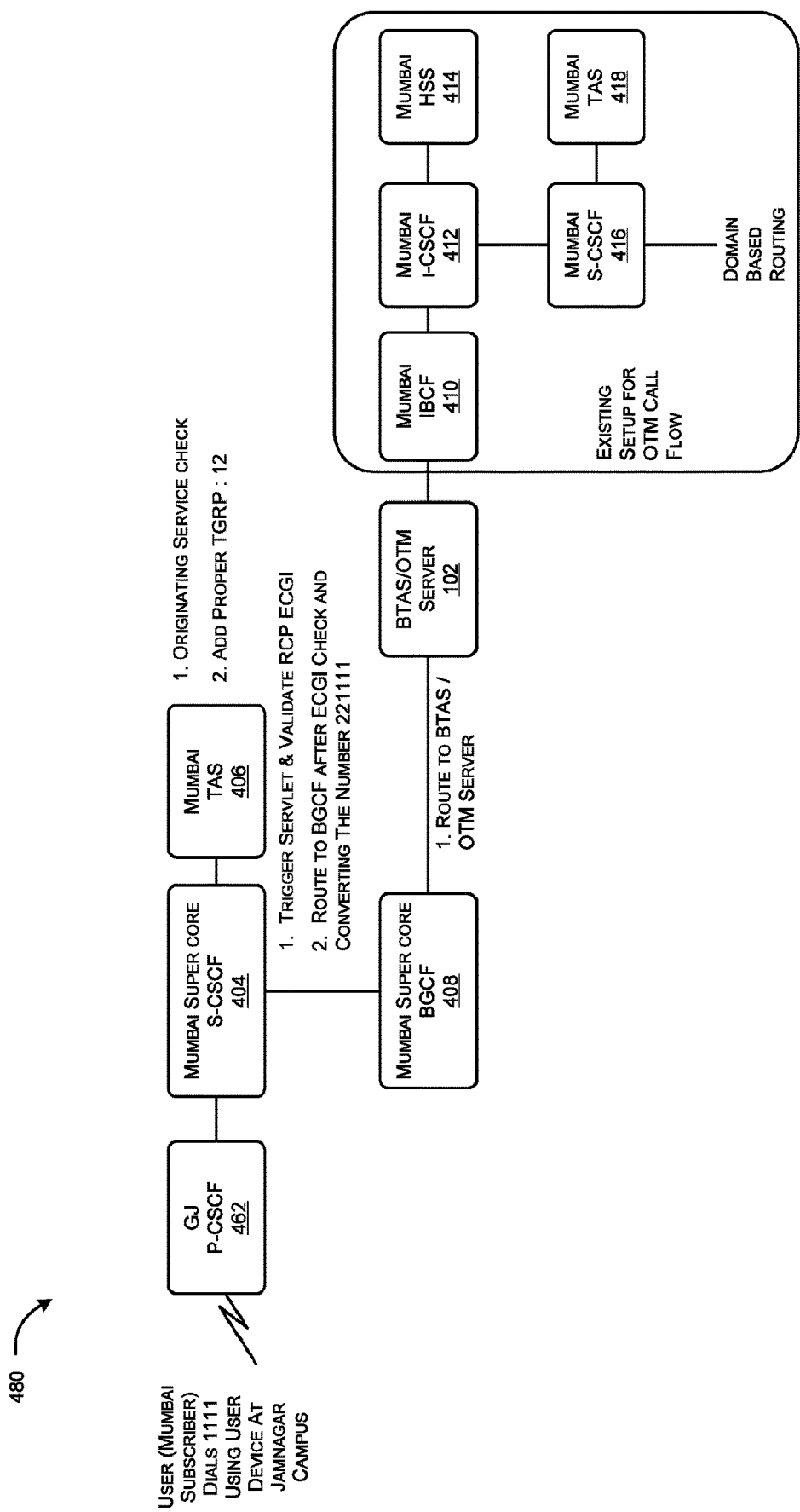

In a specific example as shown in representation 480 in FIG. 4D, the user may be, for example, a Mumbai subscriber subscribed to a wireless service (wireless user device) from a service provider. At the time of emergency, the user may be present in an allowed zone at a pre-defined location (different from the subscription location), for example in a Jamnagar office campus (in Gujarat) using a roaming network service. The user may dial the first-predefined number (initiation of original request) using his/her user device from within the allowed zone in Gujarat. In this example, as the user is in a different location, the subscription location may be verified by the IMS. Once the user may dial the short code (first pre-defined number), a corresponding Gujarat based P-CSCF module 462 of IMS server (associated with the service provider) may act as an ingress and egress point to and from IMS server. Further, the next step will be initiated by a Mumbai based S-CSCF module 404 as in this example, the user is subscribed to Mumbai circle. The Mumbai based S-CSCF 404 of the IMS server may invoke a service check toward a Mumbai based TAS 406 corresponding to subscription location (Mumbai) such that the Mumbai based TAS 406 may provide the TGRP value (in this example, TGRP=12). In the next step, the Mumbai based TAS 406 may skip standard procedures such as, number mapping (ENUM) dip for the dialed number (first pre-defined number) and may instead send a message (for example, INVITE) back to the Mumbai based S-CSCF 404 by attaching appropriate TGRP. In an embodiment, if the original request may be initiated from within the allowed zone (for example, Mumbai office campus), the original request may be allowed, otherwise it may be rejected. In case if the request is allowed, the original request routed by the Mumbai based S-CSCF module 404 to the network device or BTAS 102 (which receives routed request) through a Mumbai based BGCF 408 of the IMS server. In an embodiment, the Mumbai based BGCF 408 may select home BTAS/OTM server 102 based on TGRP received from Mumbai based S-CSCF 404. Prior to routing of the original request to the network device, the first pre-defined number may be converted into a second pre-defined number depending on the pre-defined location of the user device. In an embodiment, the Mumbai based BGCF 408 may select home BTAS/OTM server 102 based on TGRP received from Mumbai based S-CSCF module 404 and/or the nature of the second pre-defined number. For example, if the dialed code (original request) may be a number such as 1111, the second pre-defined number may be 221111, wherein the initial digits "22" may indicate that Gujarat based BTAS needs to be selected (Gujarat being the pre-defined location at which the original request was initiated).

Upon receiving the routed request, the BTAS 102 may identify, based on the pre-defined location, a pre-defined contact information pertaining to the plurality of emergency services available at the pre-defined location (Jamnagar) of the user device. The BTAS 102 may invoke, based on the identified pre-defined contact information, a call leg to initiate communication with the respective plurality of emergency services in Jamnagar. In an example embodiment, the network device or BTAS 102 may initiate the simultaneous communication by invoking the call leg towards the identified set of pre-defined numbers pertaining to the plurality of emergency services followed by initiation of MRF based call leg that facilitates to simultaneously add the identified set of pre-defined numbers, for example, in the conference communication call. The network device or BTAS 102 may route the simultaneous communication to the IMS server through Mumbai based IBCF 410 of the IMS server. Based on the invoked call leg, the IMS server may establish the simultaneous communication of the user device with the plurality of emergency services. This may be initiated by the Mumbai based I-CSCF module 412. The Mumbai based I-CSCF module 412 may be responsible for onward routing of SIP messages to the appropriate Mumbai based S-CSCF module 416 based on the subscription of network service to the user device. The Mumbai based I-CSCF 412 may query Mumbai based HSS 414 in order to discover/decide the appropriate Mumbai based S-CSCF module 416 to which the subscription may be assigned. The appropriate Mumbai based S-CSCF module 416, in communication with corresponding Mumbai based TAS 418, may enable establishment of the simultaneous communication.

Figure 5:
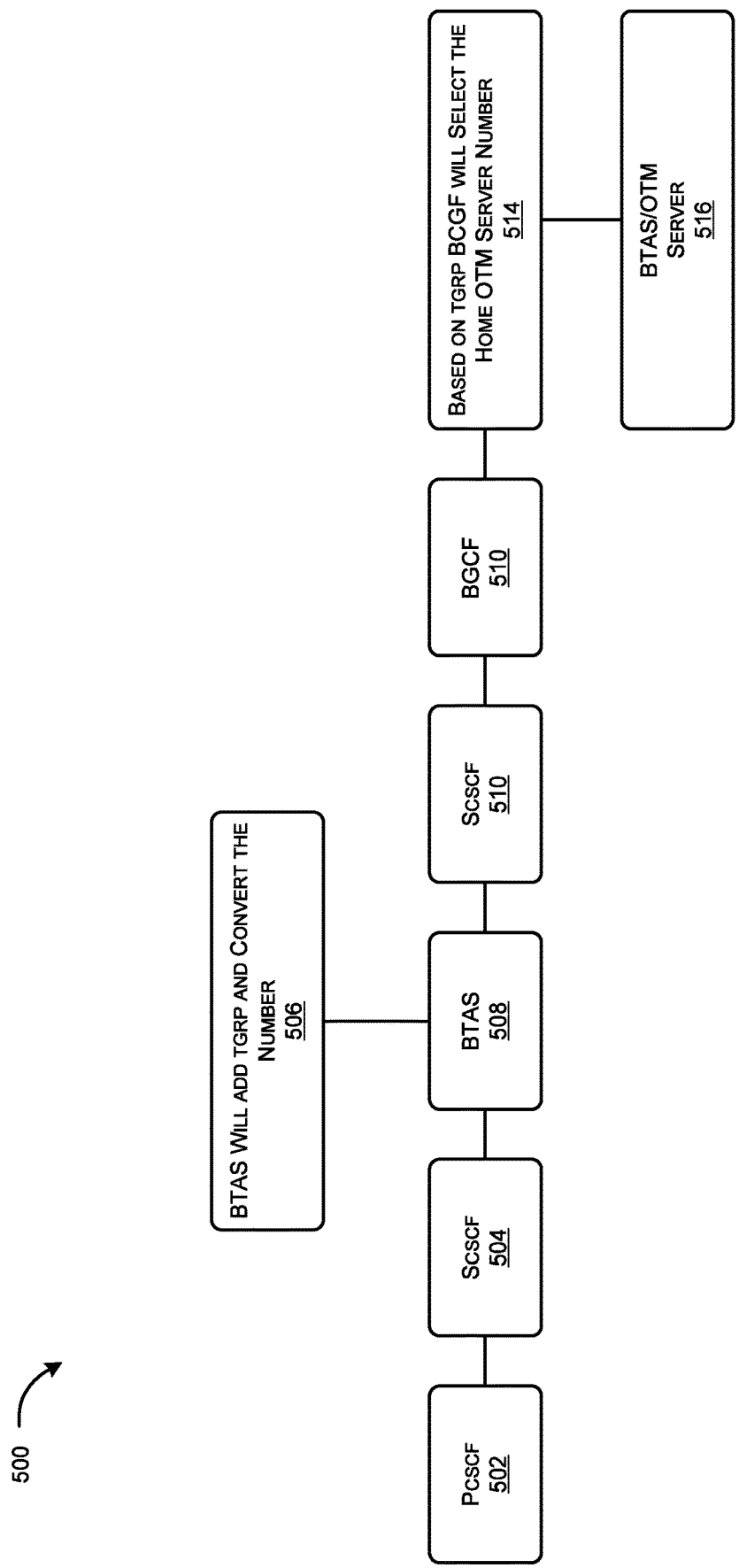
FIG. 5 illustrates exemplary representation for facilitating simultaneous communication of a wireline user device with plurality of emergency services, in accordance with embodiments of the present disclosure.

FIG. 5 illustrates exemplary representation 500 for facilitating simultaneous communication of a wireline user device with plurality of emergency services, in accordance with embodiments of the present disclosure. As shown in FIG. 5, in an example, an office SIP trunk user may dial the short code (original request) at the time of emergency i.e. the original request may be received from any one of the enterprise via a corresponding PBX (or IP-PBX) may hand it over to E-SBC (as shown in FIG. 1A), wherein the request is forwarded to BTAS 508 via corresponding P-CSCF module 502 and S-CSCF module 504. In an embodiment, when the user device is the wireline device, the evaluation of the pre-defined location is skipped such that the network device evaluates the TGRP value based on pre-defined circle wise TGRP pertaining to the user device. This is due to the fact that the wireline device may be stationary, and hence it may not be important to check the location prior to routing the original request (or for adding the TGRP). For example, the location for wireline devices in office, a hospital and home is same as that of the address of the office, the hospital or the user's home and do not require any other location specific monitoring system. The TGRP value of that address provides the emergency details for that user device. At 506, and as per an example, the BTAS 508 may apply the circle wise predefined TGRP value and convert the first pre-defined number (emergency number) into a specific format so as to match it with the number that is obtained from a user from its S-CSCF servlet. The BTAS 508 may apply charges based on an identifier information pertaining to at least one of an enterprise or a closed user group (CUG), for example, enterprise/CUG ID. In the next step, at 514, the BGCF 510 may select a home BTAS/OTM server 516 based on the TGRP and may route the call to the BTAS/OTM server 516 via domain based routing. In an example embodiment, the BTAS/OTM server 516 may maintain list of multiple participants (set of pre-defined numbers pertaining to plurality of emergency services) as static group for converted emergency number (second pre-defined number), so that the multiple participants can be merged in conference.

Figure 6:
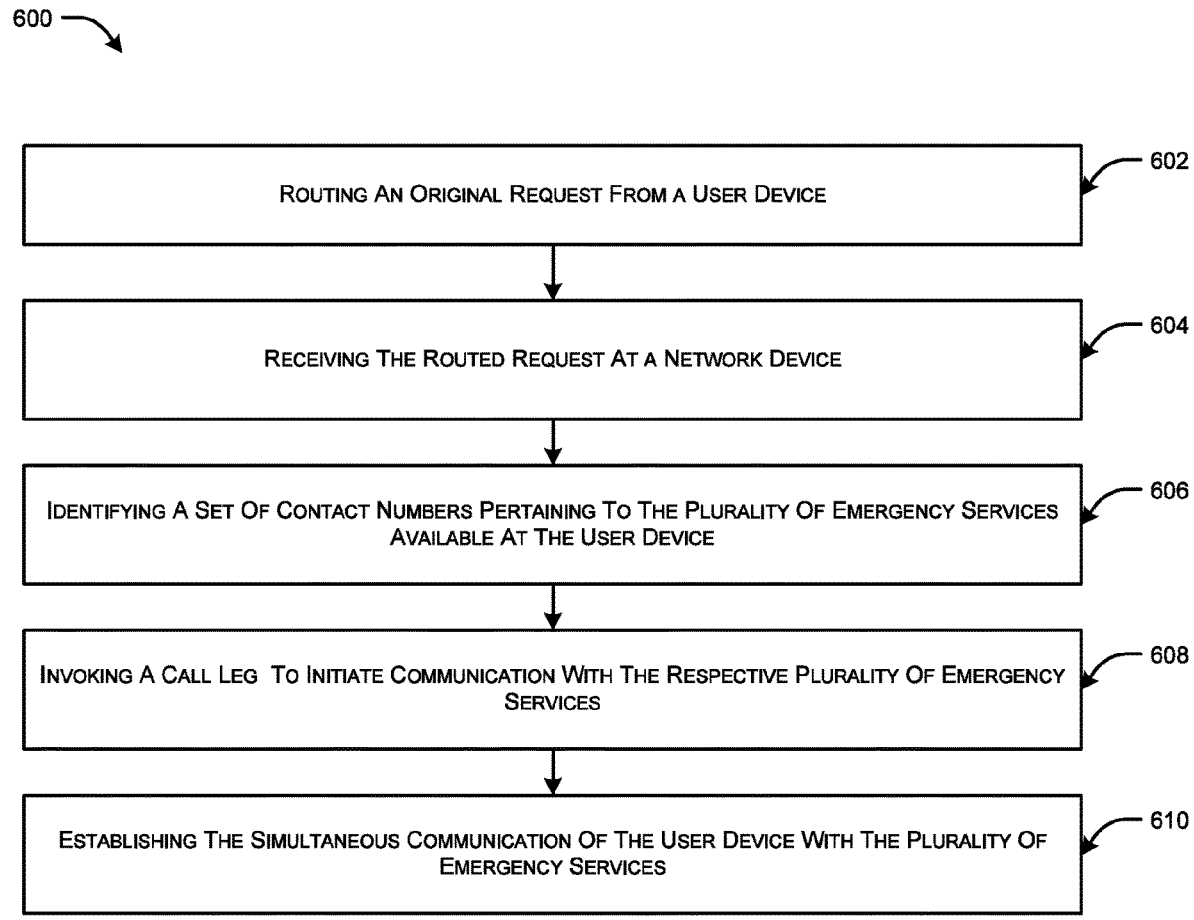
FIG. 6 illustrates an exemplary representation of flow diagram 600 for facilitating a user device to establish simultaneous communication with plurality of emergency services, in accordance with an embodiment of the present disclosure.

FIG. 6 illustrates an exemplary representation of flow diagram 600 for facilitating a user device to establish simultaneous communication with plurality of emergency services, in accordance with an embodiment of the present disclosure. The flow diagram 600 may represent a general sequence of steps in case of outgoing communication or incoming communication. At 602, the method may include a step of routing, by an Internet Protocol Multimedia Subsystem (IMS) communicably operational with a network device, an original request from the user device located at a pre-defined location or an original request from the user device associated with a Transmission Gap Repetition Period (TGRP) value based on a pre-defined circle wise TGRP pertaining to the user device. In an embodiment, the original request may indicate a requirement to establish the simultaneous communication of the user device with the plurality of emergency services. At 604, the method may include a step of receiving, at the network device, the routed request for facilitating the simultaneous communication with the plurality of emergency services at the pre-defined location. At 606, the method may include a step of identifying, by the network device, based on the pre-defined location, a pre-defined contact information pertaining to the plurality of emergency services available at the pre-defined location of the user device. At 608, the method may include a step of invoking, by the network device, based on the identified pre-defined contact information, a call leg to initiate communication with the respective plurality of emergency services. At 610, the method may include a step of establishing, by the IMS, based on the invoked call leg, the simultaneous communication of the user device with the plurality of emergency services.

In an embodiment, the original request may be initiated by a user associated with the user device through direct dialling of a first pre-defined number using the user device. The first pre-defined number may include an optimized short digit code that may be dialed directly without a need for a network based executable set of instructions. For example, the first pre-defined number may include digits in the range of 1 to 6.

In an example embodiment, prior to routing of the original request to the network device, the method may include evaluating, through the IMS, the pre-defined location of the user device at the time of initiation of the original request, and converting the first pre-defined number into a second pre-defined number depending on the pre-defined location of the user device. In an example embodiment, the conversion to the second pre-defined number may be facilitated based on Transmission Gap Repetition Period (TGRP) value that varies based on the subscription location pre-defined location of the user device. The subscription location may pertain to a location corresponding to subscription of the network service for the user device.

In an embodiment, the step of invoking may be performed towards the identified set of pre-defined numbers pertaining to the plurality of emergency services followed by initiation of MRF based call leg that facilitates to simultaneously add the identified set of pre-defined numbers in a conference communication.

In an embodiment, if the user device may be a wireless device, the method may include converting, through a S-CSCF module, the first pre-defined number into the second pre-defined number, based on an assessment to check if, at the time of initiating the original request, the user device may be located within an allowed zone of an enterprise at the pre-defined location. For example, the allowed zone may pertain to a site that may be eligible to the enterprise to avail the network service facilitated by the service provider. In an example embodiment, if the original request may be initiated from within the allowed zone, the original request may be routed by the S-CSCF module to the network device through a breakout gateway control function (BGCF) module of the IMS server. In another example embodiment, if the original request may not be from within the allowed zone, the original request may be rejected by the S-CSCF module.

In an embodiment, if the user device may be a wireline device, the evaluation of the pre-defined location may be skipped such that the method may include evaluating, by the network device, the TGRP value based on pre-defined circle wise TGRP pertaining to the user device.

Figure 7:
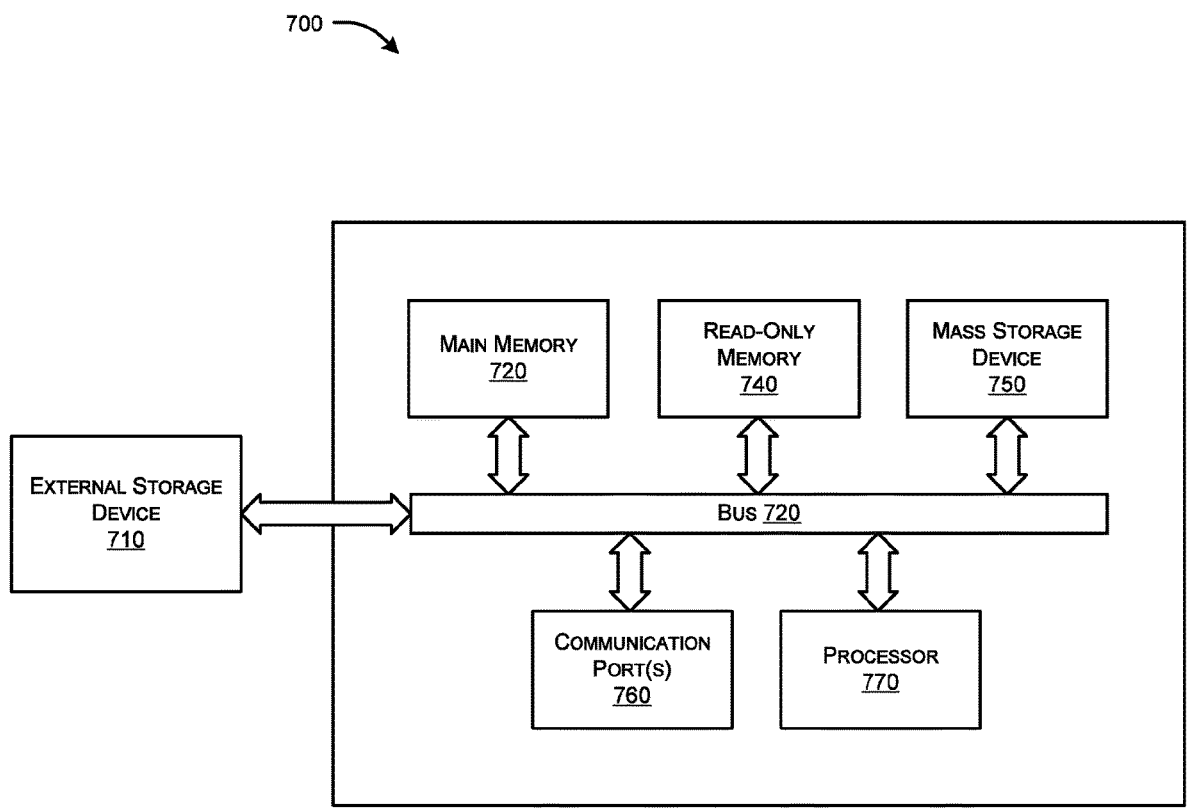
FIG. 7 illustrates an exemplary computer system in which or with which embodiments of the present invention can be utilized in accordance with embodiments of the present disclosure.

FIG. 7 illustrates an exemplary computer system in which or with which embodiments of the present invention can be utilized in accordance with embodiments of the present disclosure. As shown in FIG. 7, computer system 700 can include an external storage device 710, a bus 720, a main memory 730, a read only memory 740, a mass storage device 750, communication port 760, and a processor 770. A person skilled in the art will appreciate that the computer system may include more than one processor and communication ports. Processor 770 may include various modules associated with embodiments of the present invention. Communication port 760 can be any of an RS-232 port for use with a modem based dialup connection, a 10/100 Ethernet port, a Gigabit or 10 Gigabit port using copper or fibre, a serial port, a parallel port, or other existing or future ports. Communication port 760 may be chosen depending on a network, or any network to which computer system connects. Memory 730 can be Random Access Memory (RAM), or any other dynamic storage device commonly known in the art. Read-only memory 740 can be any static storage device(s). Mass storage 750 may be any current or future mass storage solution, which can be used to store information and/or instructions.

Bus 720 communicatively couples processor(s) 770 with the other memory, storage and communication blocks. Bus 720 can be, e.g. a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 770 to software system.

Optionally, operator and administrative interfaces, e.g. a display, keyboard, and a cursor control device, may also be coupled to bus 720 to support direct operator interaction with a computer system. Other operator and administrative interfaces can be provided through network connections connected through communication port 760. Components described above are meant only to exemplify various possibilities. In no way should the aforementioned exemplary computer system limit the scope of the present disclosure.

Thus, the present disclosure provides a technical solution for facilitating an effective and concurrent communication with multiple emergency service contacts, which, for example, may be added simultaneously in a conference communication, without the need to sequentially establish the communication as done by the conventional systems. This helps to achieve an expedited communication process for getting instant help from the emergency services at the time of emergency. Further, the user may need to dial only a short dialling code using, for example, 1-6 digits code to be dialed using keypad on the user device. The short code may not only add to convenience of contacting in case of an emergency but also can reduce the need to remember or refer to individual contact numbers of each emergency service, such as, for example, hospitals, fire and rescue services, police stations, emergency health services and other such services. Furthermore, the system and method also enable to perform location based service such that the emergency services are selected based on a current location of the user device (for example, Mumbai), even if the service may be subscribed for another location or circle (for example, Jamnagar). This may ensure that nearby emergency services at correct location (where emergency situation is present) may assist in case of an emergency. Several other advantages may be realized.

It would be appreciated that the embodiments herein are explained with respect to network device or BTAS, however, the proposed system and method can be implemented in any computing device or external devices without departing from the scope of the invention.

While considerable emphasis has been placed herein on the preferred embodiments, it will be appreciated that many embodiments can be made and that many changes can be made in the preferred embodiments without departing from the principles of the invention. These and other changes in the preferred embodiments of the invention will be apparent to those skilled in the art from the disclosure herein, whereby it is to be distinctly understood that the foregoing descriptive matter to be implemented merely as illustrative of the invention and not as limitation.

A portion of the disclosure of this patent document contains material which is subject to intellectual property rights such as, but are not limited to, copyright, design, trademark, IC layout design, and/or trade dress protection, belonging to Jio Platforms Limited (JPL) or its affiliates (herein after referred as owner). The owner has no objection to the facsimile reproduction by anyone of the patent document or the patent disclosure, as it appears in the Patent and Trademark Office patent files or records, but otherwise reserves all rights whatsoever. All rights to such intellectual property are fully reserved by the owner.

Advantages of the Present Disclosure

The present disclosure provides an effective, concurrent and improved communication with multiple emergency service contacts.

The present disclosure provides system and a method to eliminate the need for dialling long digit codes for accessing emergency services, thus making the process less tedious and more user-friendly.

The present disclosure provides an economical and next generation based system and method that can avoid the need for individually contacting each emergency service, thus avoiding unnecessary delay.

The present disclosure provides an effective system and method that can enable an instant communication with multiple emergency service contacts irrespective of the location of the user.

The present disclosure provides an option for multiparty calling and thereby communication with all required agencies in a single instance.

We claim:

1. A system for facilitating a user device to establish simultaneous communication with plurality of emergency services, the system comprising:
a network device associated with a service provider that provides a network service to the user device, wherein the network device comprises one or more processors coupled with a memory, the memory stores instructions which when executed by the one or more processors causes the system to:
receive, through an Internet Protocol Multimedia Subsystem (IMS) server communicably operational with a server associated with the network device, a routed request that is derived based on an original request from the user device, wherein the original request indicates a requirement to establish the simultaneous communication of the user device with the plurality of emergency services;
identify, based on any or a combination of the pre-defined location and a Transmission Gap Repetition Period (TGRP) value based on a pre-defined circle wise TGRP pertaining to the user device, a pre-defined contact information pertaining to the plurality of emergency services available at the location of the user device; and
invoke, based on the identified pre-defined contact information, a call leg to initiate communication with the respective plurality of emergency services,
wherein, based on the invoked call leg, the IMS server establishes the simultaneous communication of the user device with the plurality of emergency services.

2. The system as claimed in claim 1, wherein the original request is initiated by a user associated with the user device through dialing a first pre-defined number using a dialing pad of the user device, and wherein the first pre-defined number comprises an optimized short digit code that is dialed directly without a need for a network based executable set of instructions, and wherein the first pre-defined number comprises digits in a predefined range.

3. The system as claimed in claim 2, wherein, prior to routing of the original request to the network device, the IMS server evaluates the pre-defined location of the user device at the time of initiation of the original request, and wherein prior to routing of the original request to the network device, the first pre-defined number is converted into a second pre-defined number depending on the pre-defined location of the user device.

4. The system as claimed in claim 3, wherein the conversion to the second pre-defined number is facilitated based on a Transmission Gap Repetition Period (TGRP) value that varies based on a subscription location of the user device, and wherein the subscription location pertains to a location corresponding to subscription of the network service for the user device.

5. The system as claimed in claim 4, wherein upon receiving the original request from the user device, the IMS server invokes a service check towards a telephony application server (TAS) corresponding to the subscription location such that the corresponding TAS provides the TGRP value.

6. The system as claimed in claim 1, wherein the user device is at least one of a wireless or wireline device that is subscribed or registered to the network service provided by the service provider, wherein the network service pertains to a fifth generation (5G) network, and wherein the service provider provides the network service corresponding to at least one of one of a cellular network service, a private network service, a satellite network service or a convergence network service.

7. The system as claimed in claim 6, wherein if the user device is a wireless device, the IMS server converts the first pre-defined number into the second pre-defined number, based on an assessment to check if, at the time of initiating the original request, the user device is located within an allowed zone of an enterprise at the pre-defined location, and wherein the allowed zone pertains to a site that is eligible to avail the network service facilitated by the service provider.

8. The system as claimed in claim 7, wherein if the original request is initiated from within the allowed zone, the original request is routed by the IMS server to the network device, and wherein, based on at least one of the TGRP or the nature of the second pre-defined number, the original request is routed to a corresponding network device at the pre-defined location.

9. The system as claimed in claim 7, wherein if the original request from within the allowed zone, the original request is rejected by the IMS server.

10. The system as claimed in claim 1, wherein the simultaneous communication facilitates to connect the user device with the plurality of emergency services through a conference communication call comprising at least one of an audio call or a video call.

11. The system as claimed in claim 10, wherein the network device initiates the simultaneous communication by invoking the call leg towards the identified set of pre-defined numbers pertaining to the plurality of emergency services followed by initiation of multimedia resource function (MRF) based call leg that facilitates to simultaneously add the identified set of pre-defined numbers in the conference communication call.

12. The system as claimed in claim 11, wherein the invoked call leg and the MRF based call leg is facilitated through exchange of communication data comprising at least one of a textual data, a video data and an audio data.

13. A user equipment (UE) device (110) for facilitating simultaneous communication with a plurality of emergency services, the UE (110) being communicatively coupled to a network device, said coupling comprising the steps of:
    receiving a connection request from any or a combination of a mobile and a landline device, the connection request comprising dialing of an emergency number;
    sending an acknowledgment of the connection request to the network device; and
    transmitting a plurality of signals in response to the connection request, wherein said network device is a BTAS server as claimed in claim 1.

14. A method for facilitating a user device to establish simultaneous communication with plurality of emergency services, the method comprising:
    routing, by an Internet Protocol Multimedia Subsystem (IMS) server communicably operational with a network device, an original request from the user device, wherein the original request indicates a requirement to establish the simultaneous communication of the user device with the plurality of emergency services;
    receiving, at the network device, the routed request for facilitating the simultaneous communication with the plurality of emergency services;
    identifying, by the network device, based on any or a combination of the pre-defined location and a Transmission Gap Repetition Period (TGRP) value based on a pre-defined circle wise TGRP pertaining to the user device, a pre-defined contact information pertaining to the plurality of emergency services available at the pre-defined location of the user device;
    invoking, by the network device, based on the identified pre-defined contact information, a call leg to initiate communication with the respective plurality of emergency services; and
    establishing, by the IMS, based on the invoked call leg, the simultaneous communication of the user device with the plurality of emergency services.

15. The method as claimed in claim 14, wherein the original request is initiated by a user associated with the user device through direct dialing of a first pre-defined number using the user device, wherein the first pre-defined number comprises an optimized short digit code that is dialed directly without a need for a network based executable set of instructions, and wherein the first pre-defined number comprises digits in the range of 1 to 6.

16. The method as claimed in claim 15, wherein prior to routing of the original request to the network device, the method comprises evaluating, through the IMS, the pre-defined location of the user device at the time of initiation of the original request, and converting the first pre-defined number into a second pre-defined number depending on the pre-defined location of the user device, and wherein the conversion to the second pre-defined number is facilitated based on Transmission Gap Repetition Period (TGRP) value that varies based on the subscription location of the user device, and wherein the subscription location pertains to a location corresponding to subscription of a network service for the user device.

17. The method as claimed in claim 16, wherein if the user device is a wireless device, the method comprises converting, through the IMS server, the first pre-defined number into the second pre-defined number, based on an assessment to check if, at the time of initiating the original request, the user device is located within an allowed zone of an enterprise at the pre-defined location,
    wherein the allowed zone pertains to a site that is eligible to the enterprise to avail the network service facilitated by a service provider, and
    wherein if the original request is initiated from within the allowed zone, the original request is routed by the IMS server to the network device, and
    wherein if the original request is not from within the allowed zone, the original request is rejected by the IMS server.

18. The method as claimed in claim 16, wherein if the user device is a wireline device, the evaluation of the pre-defined location is skipped such that the method comprises evaluating, by the network device, the TGRP value based on pre-defined circle wise TGRP pertaining to the user device.

19. The method as claimed in claim 16, wherein the invoking is performed towards the identified set of pre-defined numbers pertaining to the plurality of emergency services followed by initiation of multimedia resource function (MRF) based call leg that facilitates to simultaneously add the identified set of pre-defined numbers in a conference communication.

20. A non-transitory computer readable medium comprising machine executable instructions that are executable by a processor to:
    receive, through an Internet Protocol Multimedia Subsystem (IMS) server communicably operational with a server associated with a network device, a routed request that is derived based on an original request from the UE located at a pre-defined location, wherein the original request indicates a requirement to establish the simultaneous communication of the UE with a plurality of emergency services at the pre-defined location, wherein the network device is associated with a service provider that provides a network service to the network device, wherein the network device is operatively coupled to the non-transitory computer readable medium;
    identify, based on any or a combination of the pre-defined location and a Transmission Gap Repetition Period (TGRP) value based on a pre-defined circle wise TGRP pertaining to the UE, a pre-defined contact information pertaining to the plurality of emergency services available at the pre-defined location of the UE; and invoke, based on the identified pre-defined contact information, a call leg to initiate communication with the respective plurality of emergency services, wherein, based on the invoked call leg, the IMS server establishes the simultaneous communication of the UE with the plurality of emergency services.

\* \* \* \* \*